Aug. 3, 1965                    E. J. JUSTUS                    3,198,695
                GROOVED PRESS ROLL ASSEMBLIES WITH A YANKEE DRIER
Filed Aug. 15, 1963                                        10 Sheets-Sheet 1
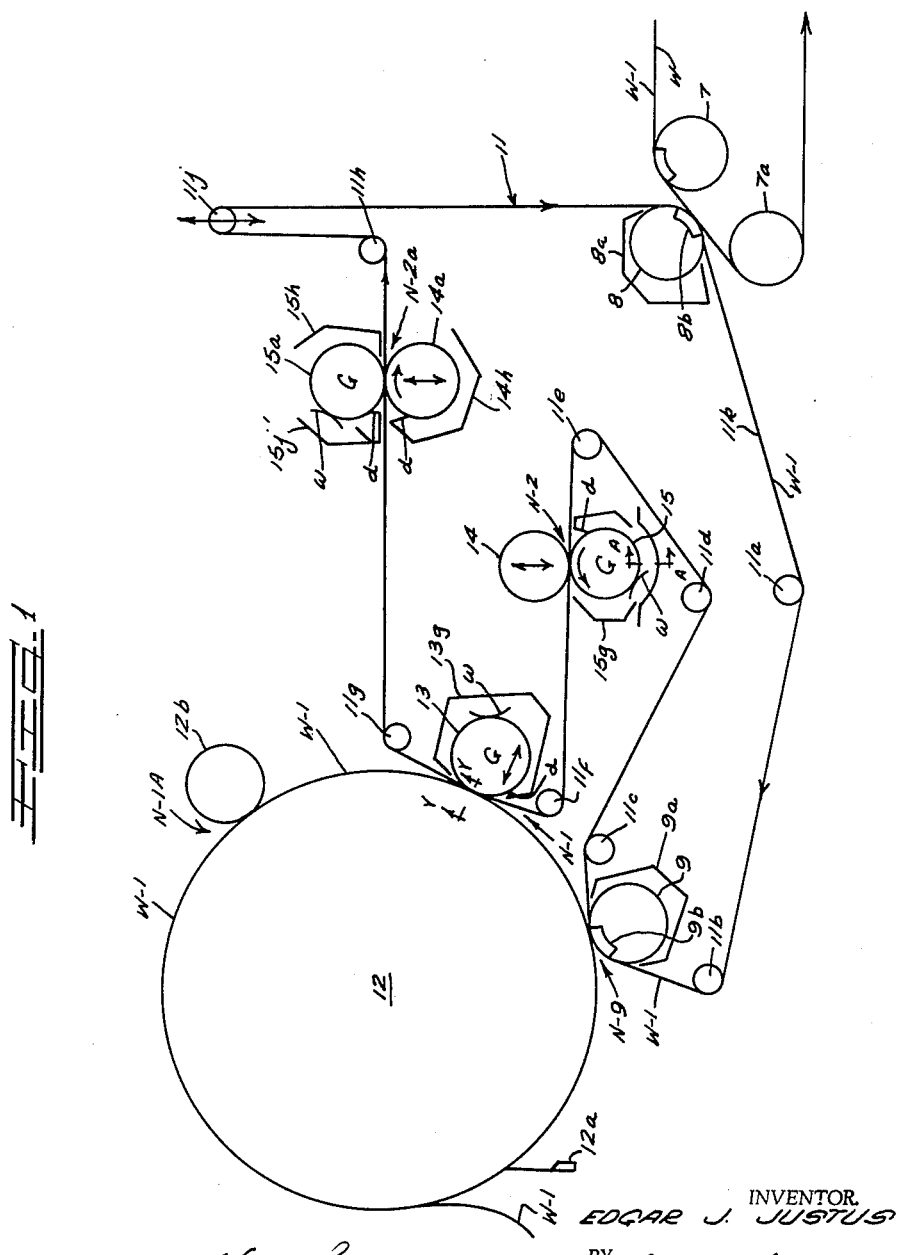
INVENTOR.
EDGAR J. JUSTUS
BY
ATTORNEYS

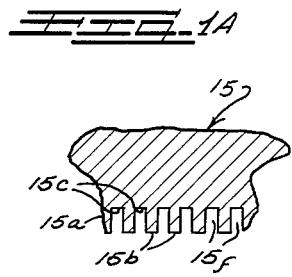
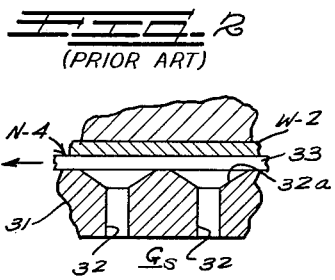
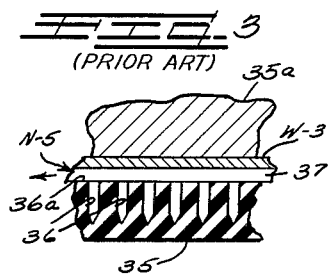
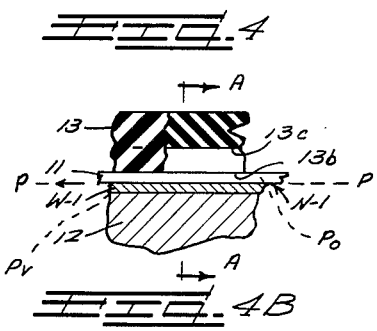
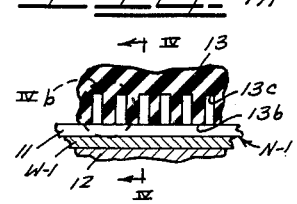
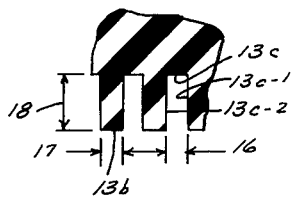
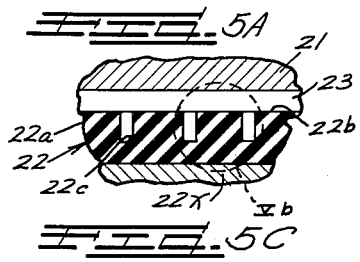
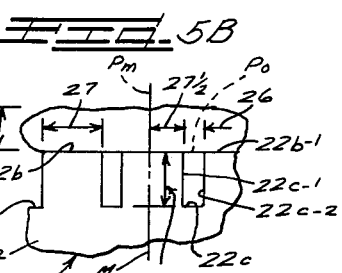
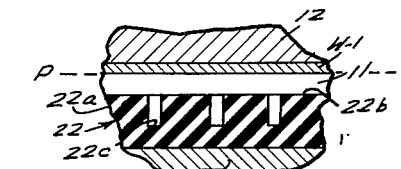
INVENTOR.
EDGAR J. JUSTUS

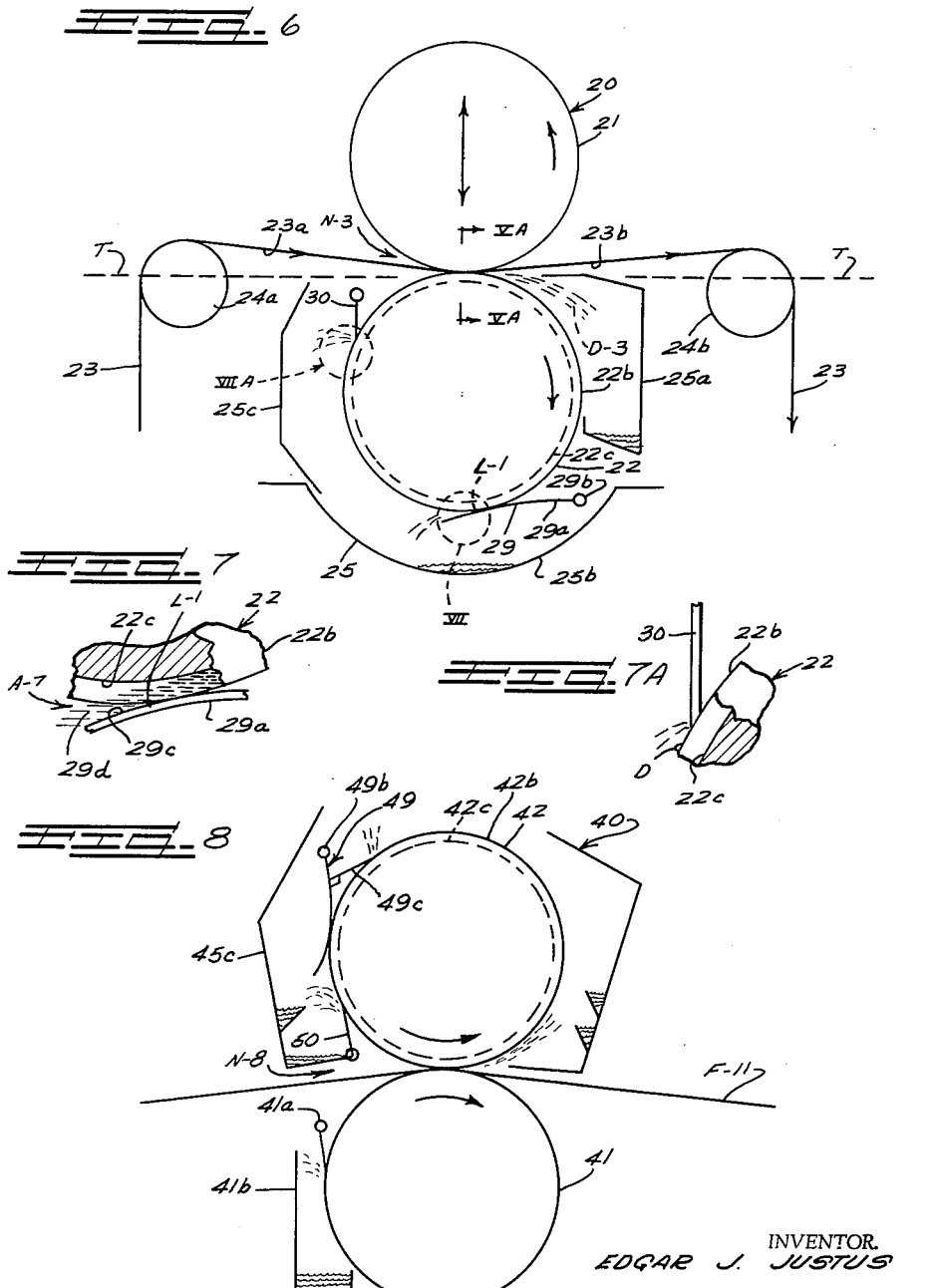

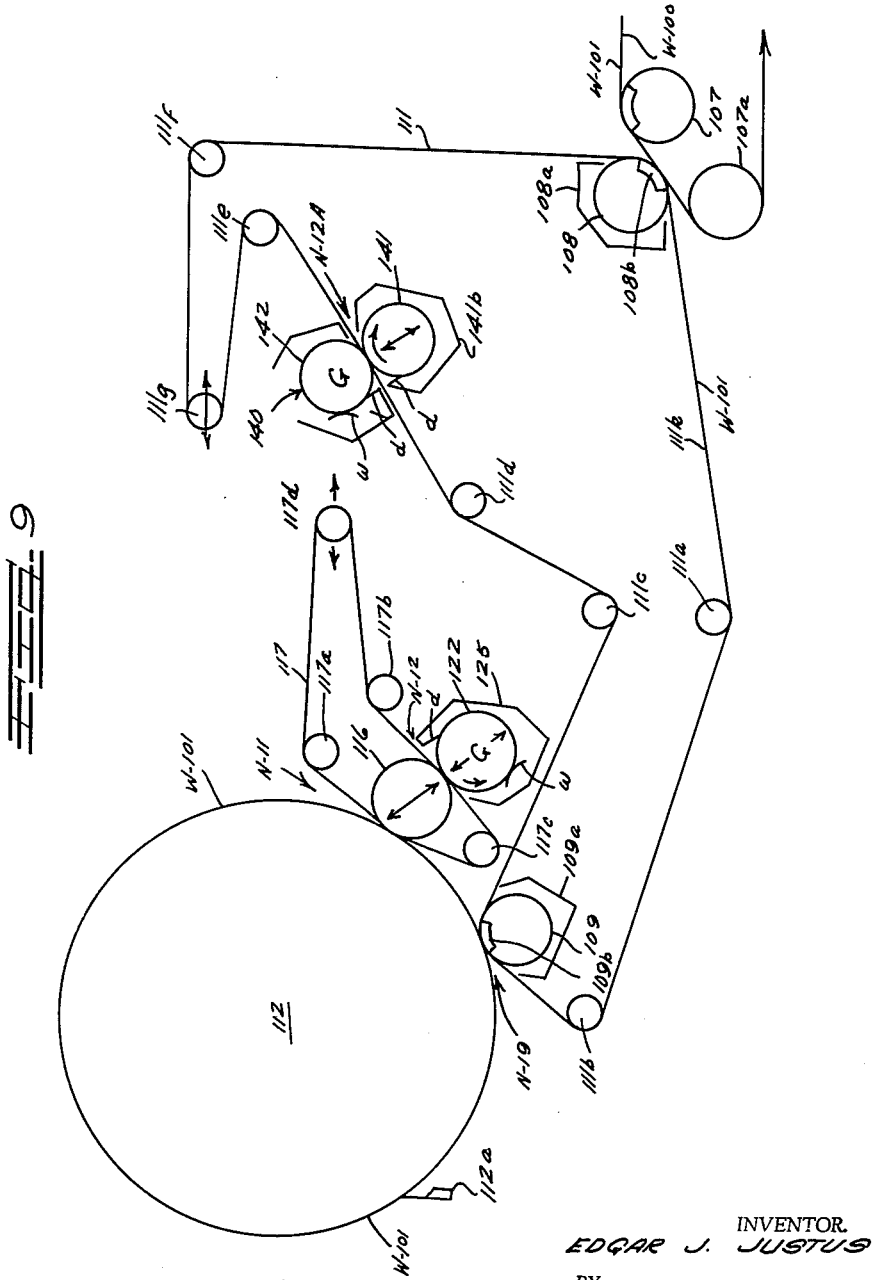

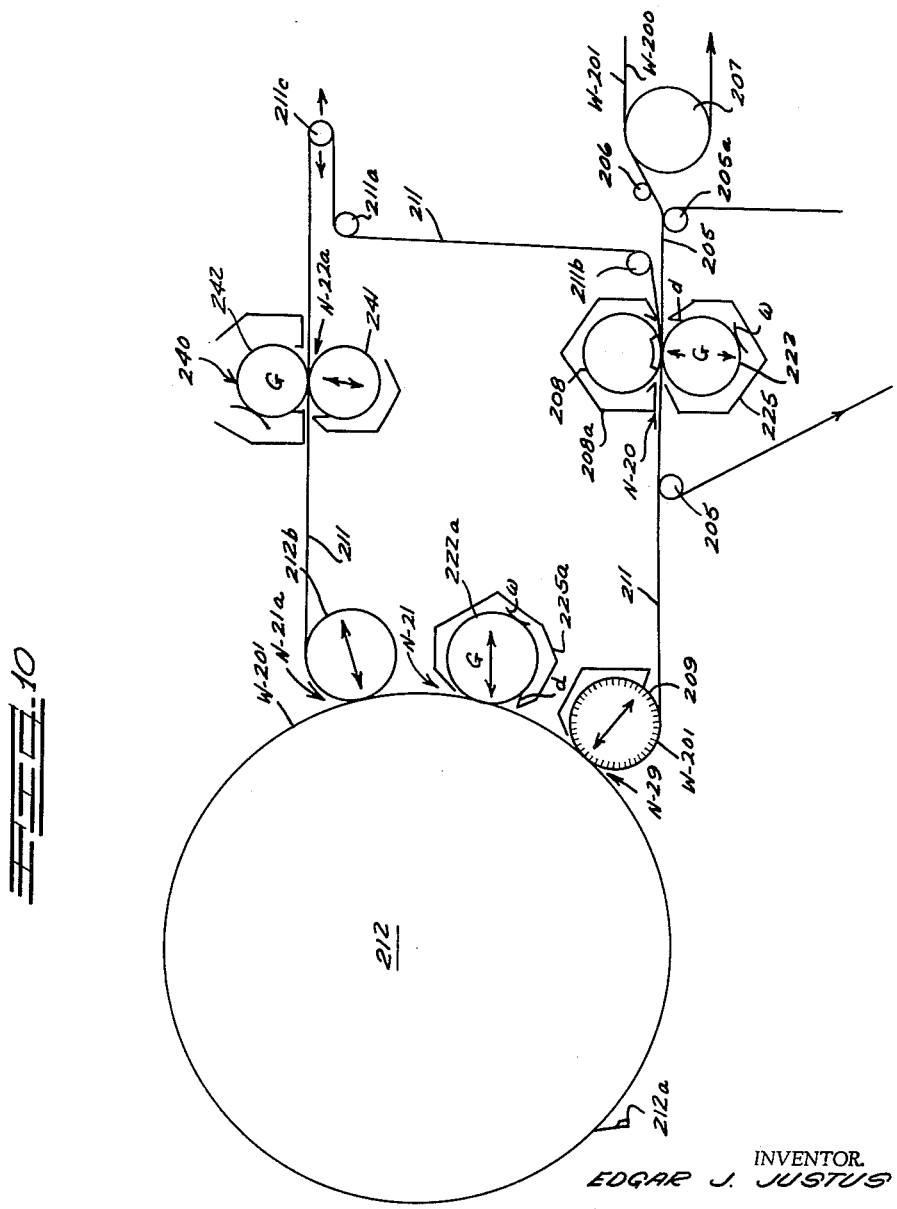

Aug. 3, 1965 E. J. JUSTUS 3,198,695
GROOVED PRESS ROLL ASSEMBLIES WITH A YANKEE DRIER
Filed Aug. 15, 1963 10 Sheets-Sheet 6
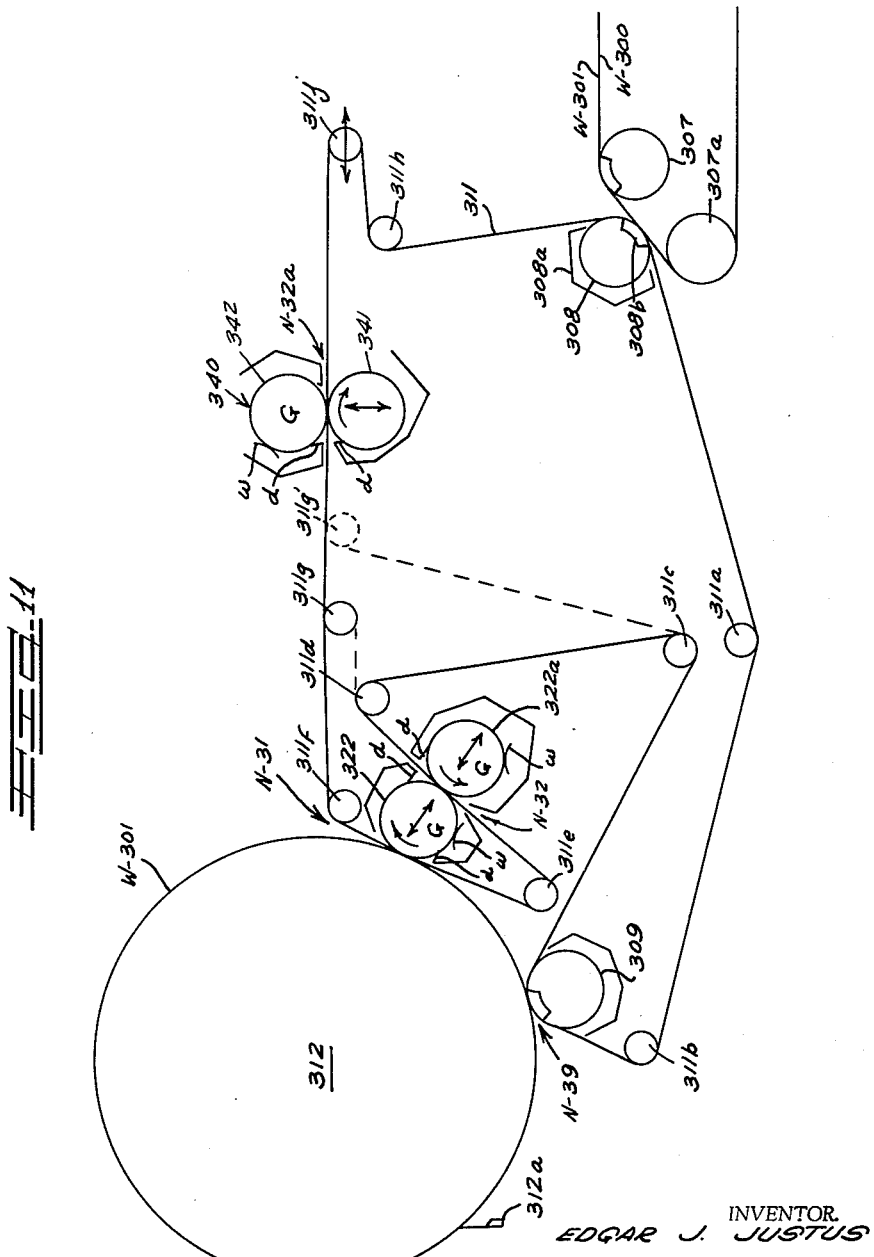
INVENTOR.
EDGAR J. JUSTUS
BY
ATTORNEYS

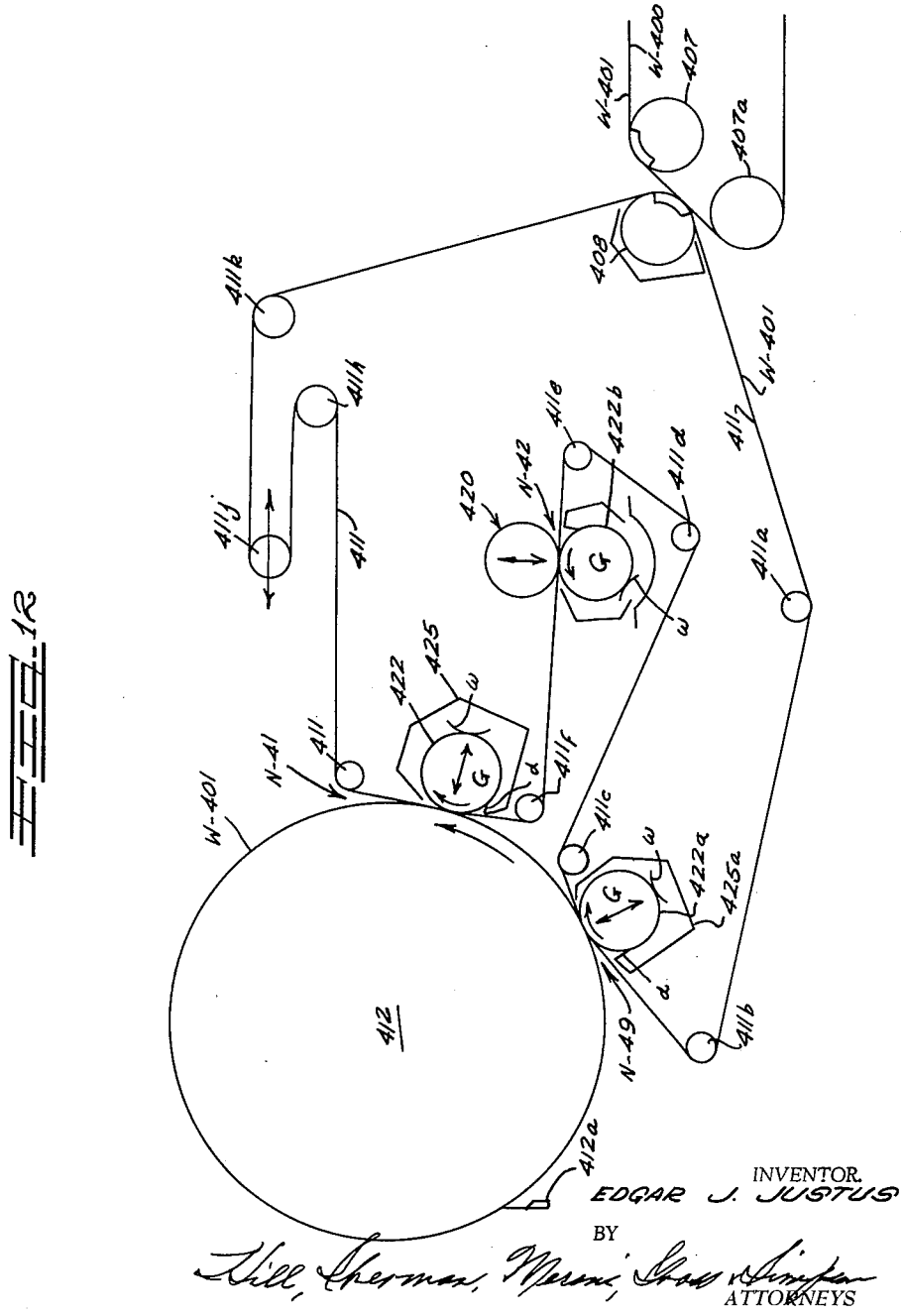

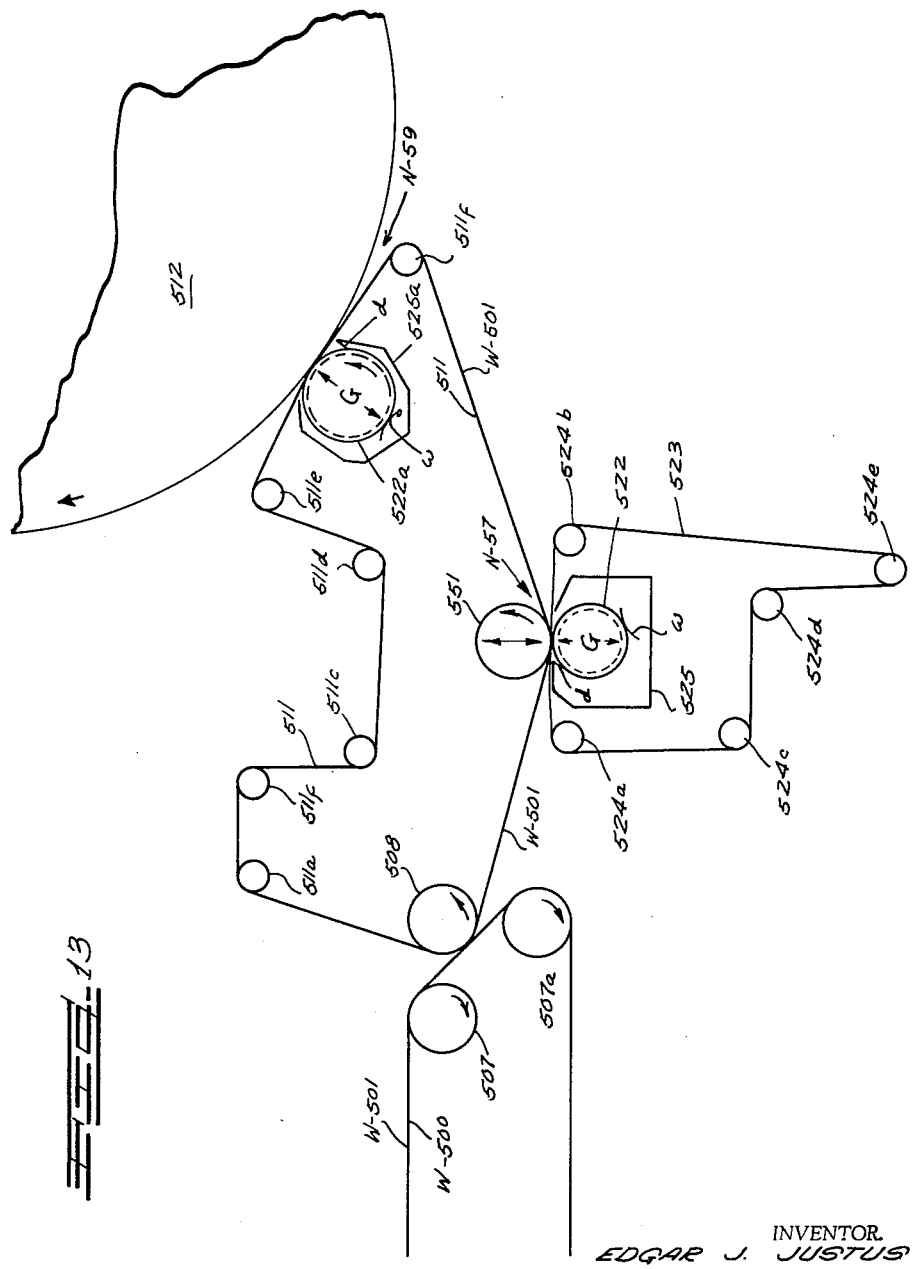

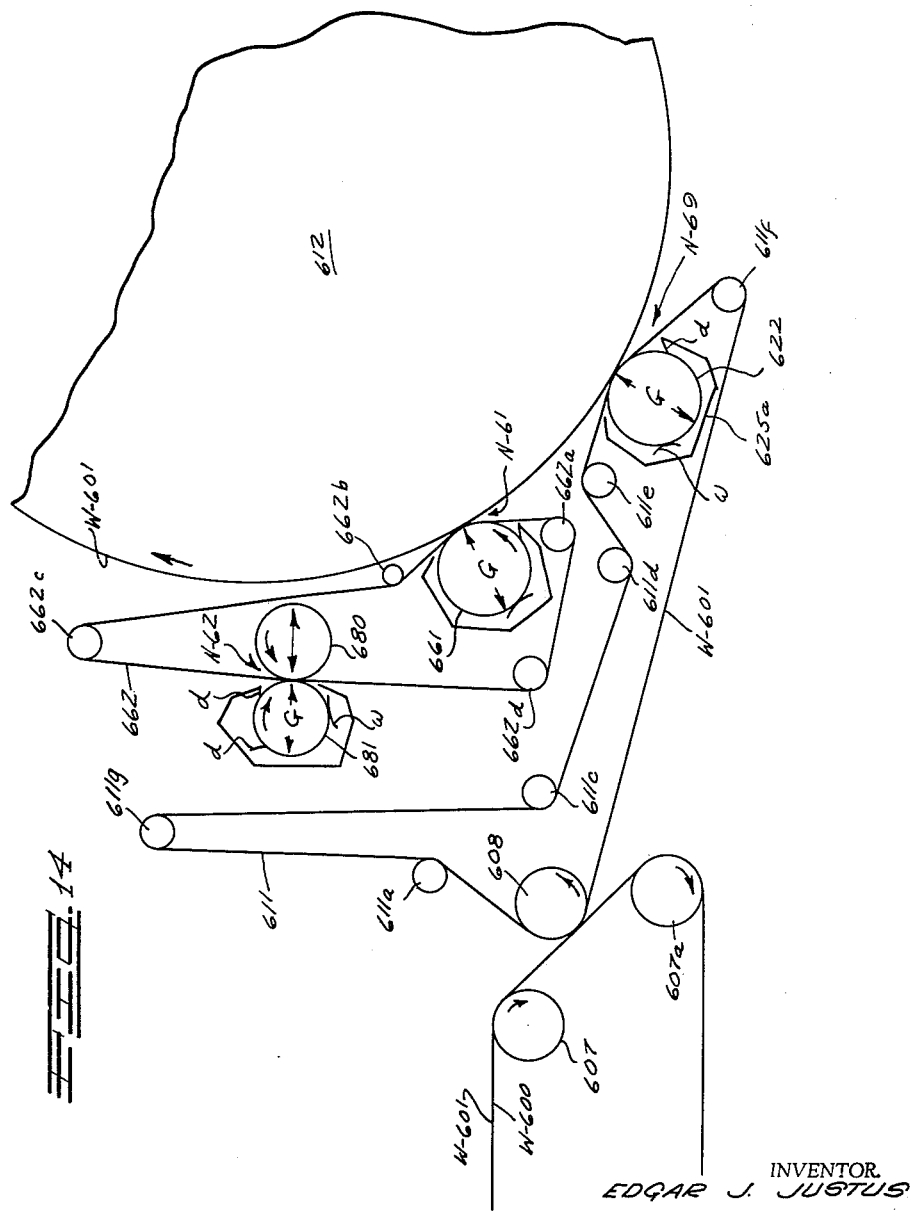

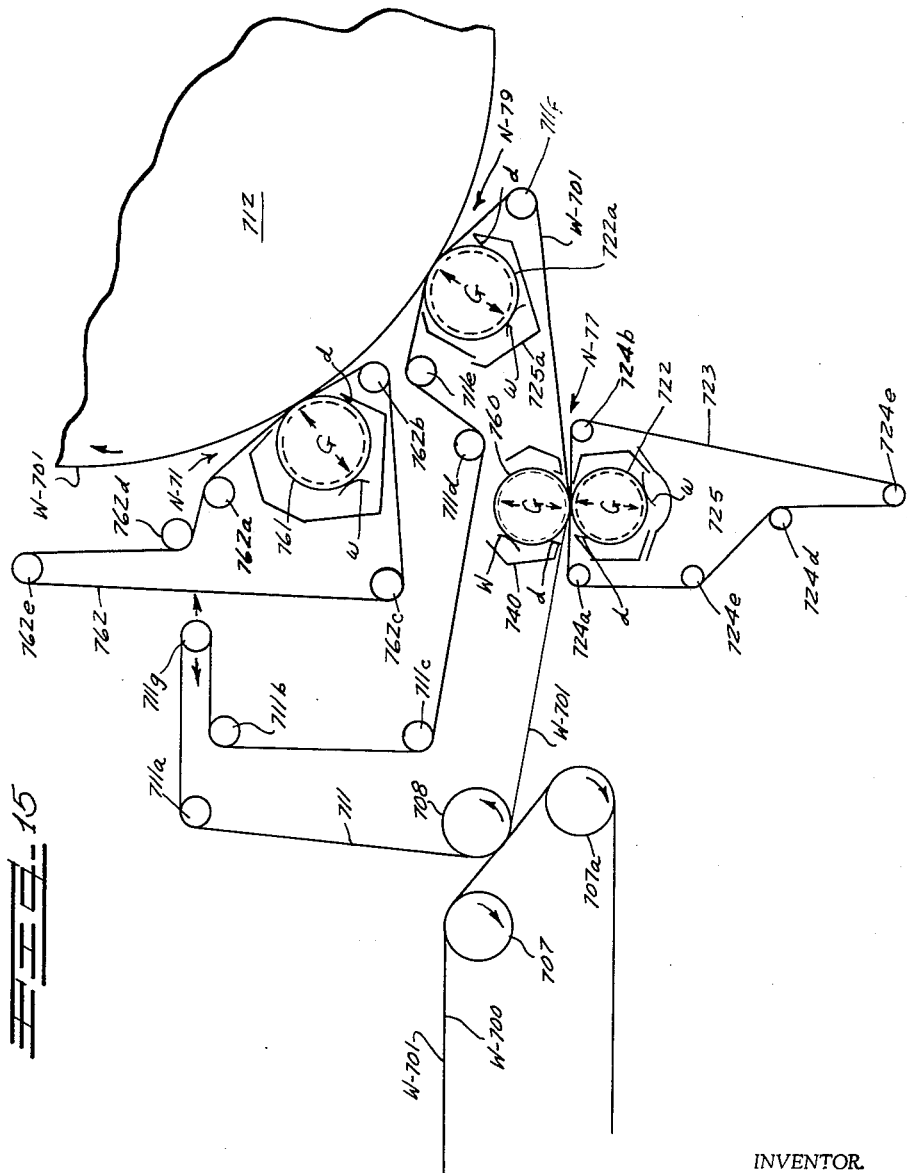

3,198,695
GROOVED PRESS ROLL ASSEMBLIES
WITH A YANKEE DRIER
Edgar J. Justus, Beloit, Wis., assignor to Beloit Corporation, Beloit, Wis., a corporation of Wisconsin
Filed Aug. 15, 1963, Ser. No. 302,421
1 Claim. (Cl. 162—359)

This is a continuation-in-part of my application, Serial No. 214,589, entitled "Divided Press," filed August 3, 1962, and my application Serial No. 258,391, entitled "Press Roll and Assemblies," filed February 14, 1963, both now abandoned.

The present invention relates to an improvement in devices for removing liquid from a liquid-containing web material, and more particularly, to improved Yankee drier type paper machines and presses, wherein the machines include a Yankee drier and one or more press rolls in nip defining relation therewith.

Although the instant invention may have a number of uses in different fields, it is used to particular advantage in the art of paper making and will be described primarily in connection therewith. In a web press, as used in a paper machine, a "web" nip is formed between opposed press rolls, and a traveling paper web in engagement with a felt is passed through the nip. In prior art structures, the press rolls used have been plain, or the roll covered by the felt at the nip may be provided with a perforate shell having a suction gland opposite the nip for aiding in the removal of moisture from the web through the felt, as in the case of the conventional suction press. In other instances, as indicated in Walker U.S. Patent No. 3,023,805, the felt covered press roll may be provided with an imperforate shell having a blind drilled rubber cover thereon for at least temporarily receiving water expressed from the web and through the felt at the web nip. In still other web presses, the felt covered press roll may be provided with other types of "blind" recesses or fine porous structure, or structures in the form of a woven wire or fabric wrap on the roll cover or surface portion of rolls provided with imperforate shells, and in such instances the felt ordinarily functions as a drying felt for the web and carries away a substantial amount if not all of the water that is to be removed from the web at the web nip. This then requires a separate procedure and/or apparatus for dewatering the felt before returning the same to the web press nip. In my copending application Serial No. 214,589, filed August 3, 1962 and Serial No. 258,391, filed February 14, 1963, certain improvements in devices for dewatering the felt at a separate, felt only press nip are described in detail. In addition, certain press roll structures were described in said application for dewatering the felt at the felt only press nip in a divided press and also for assisting in dewatering the felt at the web press (i.e. assisting in removal of water from the felt that has been pressed from the web through the felt at the web press nip). This is a continuation-in-part of my application Serial No. 214,589, filed August 3, 1962 and Serial No. 258,391, filed February 14, 1963, and is directed to press assemblies or sections incorporating one or more grooved press rolls with certain auxiliary equipment which functions in a unique fashion with the grooved press roll.

Heretofore, press arrangements have been used for attempting to remove water from the felt at the web nip. Each of these arrangements has required an alteration of structure as compared with a plain press nip, by either incorporating additional materials in the nip or modifying the plain press roll which supports the felt in the nip, for example, by replacing this roll with a suction roll. The suction roll is capable of excellent performance in certain uses, but it must be appreciated that the manufacture of the perforated suction roll shells, plus the auxiliary equipment essential to the maintenance of the desired subatmospheric pressures in the suction roll gland, is relatively expensive. Moreover, the use of the suction roll gland within the perforate suction roll shell does not make it possible to use conventional or improved anti-deflection roll means mounted within the interior of the shell for maintenance of the most uniform nip pressures. The relatively large size of the suction roll perforations (plus the pressure differential created by the suction gland at the suction roll periphery) facilitates water removal from the felt, but in situations involving the use of lightweight felts and/or the production of comparatively sensitive paper webs or high quality paper webs, there is a tendency for the webs to develop what is known as "shadow marking" as a result of such suction roll perforations, even though they are covered by a felt at the suction press nip.

In the more recently developed so-called "divided press," efforts have been made to dispense with the use of the suction press roll at the web press nip, by replacing the same with a plain press roll or with rolls of this general type having imperforate press roll shells but covered with a myriad of blind drilled holes, small blind recesses, pores, etc. These rolls with such recesses thereon are employed primarily to avoid overloading the web press nip with water and to permit a portion of the water load to be received in the recesses at the nip, although the water load in the recesses is generally returned substantially to the felt at the off-running side of the web nip. Various other press roll means, including suction press rolls, are then employed at a separate felt only press to dewater the felt to the extent necessary to prepare it for reentrance into the web press nip in such divided press structure. The instant invention is directed to improvements not only in the web press structure but also in the felt only press structures, which are brought about primarily by the use of certain grooved press rolls in these press structures. A significant advantage of such press rolls, having generally peripherally or circumferentially aligned grooves, is that the roll surfaces at the press nips are vented via the grooves to ambient atmosphere so as to facilitate the dewatering function of the press roll at the press nip. It will be appreciated that in such a grooved press roll, the grooves are applied to an imperforate shell which is capable of mounting with anti-deflection means and without expensive auxiliary suction roll equipment. Still other significant advantages are obtained by the use of specific grooved roll structures and auxiliary equipment which will be described in greater detail herein.

The instant invention thus has as its primary object the provision of an improved press assembly for the removal of liquid from a liquid-containing web material (which might be a moist felt alone or a felt and web combination).

Another object of the instant invention is to provide an improved divided press structure wherein the press rolls at the web press and/or the felt only press have improved structure and function.

Yet another object of the instant invention is to provide an improved press structure wherein the advantages of anti-deflection roll mountings may be used, inexpensive roll structures are used, and simplified structures are provided for water removal from a moist web or felt material and/or from the surface of the press roll itself.

A further object of the instant invention is to provide an improved grooved press roll structure, that is inexpensive to manufacture, particularly useful and reliable in its water removal function, and readily maintained in functional operation. An additional object of the invention includes the provision of improved devices for cooperation with such grooved roll to clean and maintain the same, dewater the same during operation, and take advantage of the improved dewatering function of the same.

Yet another object of the instant invention is to provide improved Yankee drier type paper machines.

Other and further objects, features and advantages of the present invention will become apparent to those skilled in the art from the following detailed disclosure thereof and the drawings attached hereto and made a part hereof.

On the drawings:

FIGURE 1 is an essentially diagrammatic side elevational view of a Yankee drier machine embodying the instant invention:

FIGURE 1A is a fragmentary detail view taken substantially along the line A—A of FIGURE 1;

FIGURE 2 is a fragmentary detail sectional view showing a portion of a suction press nip of the prior art;

FIGURE 3 is a view comparable to FIGURE 2 showing a portion of a press nip embodying blind drilled holes in one roll, as used in the prior art;

FIGURE 4 is a view comparable to FIGURES 2 and 3 but showing a portion of a press nip embodying the instant invention;

FIGURE 4A is a fragmentary detail sectional view taken substantially along the line A—A of FIGURE 4 and comparable to a section taken substantially along the line Y—Y of FIGURE 1;

FIGURE 4B is a sectional fragmentary enlargement taken substantially at the encircled portion designated IVB in FIGURE 4A;

FIGURES 5A and 5C are fragmentary sectional elevational views comparable to that of FIGURE 4A, but showing an improved embodiment of the instant invention;

FIGURE 5B is a fragmentary enlargement taken from FIGURE 5A at substantially the encircled portion marked VB;

FIGURES 6 and 8 are essentially diagrammatic elevational views of press assemblies embodying the instant invention;

FIGURES 7 and 7A are enlarged fragmentary detail views taken substantially from the encircled portions of FIGURE 6 marked VII and VIIA, respectively;

FIGURES 9 through 15 are essentially diagrammatic elevational views of other Yankee drier machines embodying the instant invention and demonstrating the versatility of the use of the grooved roll of the instant invention in Yankee drier machines.

As shown on the drawings:

Referring to FIGURE 1, it will be seen that a Yankee drier machine is shown therein with the Yankee drier being designated by the reference numeral 12. In the machine of FIGURE 1, a web W–1 traveling on a forming wire W turning over a suction couch roll 7 and a turning roll 7a is removed from the wire W by a suction pickup roll 8 wrapped by a felt 11. The suction pickup roll is provided with conventional saveall 8a and suction area 8b and its effects the transfer of the web W–1 from the surface of the wire W to the underside of a downrunning felt reach 11k around felt guide rolls 11a and 11b and into an initial suction nip defined by a suction roll 9 equipped with a conventional saveall 9a and suction area 9b at the oncoming side of the nip N–9 to avoid build up of water at the nip N–9 and permit the pasting or sticking of the web W–1 on to the surface of the Yankee drier 12 at the nip N–9. The web W–1 then follows on the uprunning side of the Yankee drier 12 to a second web nip N–1 where it is pressed by a grooved roll 13 wrapped by the felt 11 for purposes of further dewatering of the web W–1, which then continues on the uprunning side of the (normally heated) Yankee drier 12 away from the nip N–1 and the felt 11 at the off-running side of the nip N–1 to a final smoothing roll nip N–1a which is preferably employed with the device of FIGURE 1 using still an additional plain press roll 12b. The press roll 12b may be wrapped by a felt, if desired.

The felt 11 is separated from the web W–1 on the Yankee drier 12 at the off-running side of the suction nip N–1 by the guide roll 11c and is then passed around guide rolls 11d and 11e and into a felt only press nip N–2 which is defined by an upper plain roll 14 and a lower grooved roll 15. The felt guide rolls 11e and 11f maintain the felt 11 substantially tangential to the rolls 14 and 15 in the felt only nip N–2, and the grooved roll 15 is provided with alternating circumferential groove and land areas (as indicated in FIGURE 1A), and further is provided with an appropriate saveall 15g mounted in close running relation to the off-running side of the nip N–2 and mounting a pumping type wiper w and also mounting a conventional doctor d close to the oncoming side of the nip N–2 to wipe the land areas dry as the grooved roll approaches the felt only press nip N–2. The felt 11 then proceeds between the felt guide rolls 11f and 11g in a generally tangential reach between the Yankee drier and the grooved roll 13 so as to contact the web W–1 on the drier as well as the grooved surface of the roll 13 substantially only at the pressure area for the web press nip N–1.

Next, the felt 11 passes around the felt guide roll 11g and in another felt reach to the guide roll 11h, the felt 11 is again maintained generally tangential to the pair of press rolls 14a and 15a providing a second felt only nip N–2a between a lower plain roll 14a and an upper grooved roll 15a. The upper grooved roll 15a is provided with a saveall section 15h at the off-running side to pick up droplets of water thrown from the grooved surface of the roll 15a and a second saveall section 15j at the oncoming side of the nip N–2a mounting a pumping type wiper w and a conventional doctor (positioned as close as possible to the oncoming side of the nip N–2a) to keep the land areas clean approaching the felt only nip N–2a. The plain roll 14a is also provided with a saveall 14h and a doctor d at the oncoming side of the nip N–2a.

Next, the felt 11 passes around an appropriate felt stretcher roll 11j and then back to the suction pickup roll 8 to complete the felt cycle.

In the arrangement of FIGURE 1, each of the grooved rolls 15, 13 and 15a has the general grooved structure shown alone in FIGURE 1A and the grooved roll 13 has the grooved structure which is shown for the web press nip N–1 in FIGURES 4, 4A and 4B.

Although the specific aspects of FIGURES 4, 4A and 4B will be discussed in detail hereinafter and the advantages of a grooved roll structure of the type shown in FIGURES 5A and 5B for one or more rolls to be used in place of the grooved rolls 15, 13 and 15a will also be discussed in detail hereinafter; it should be noted for the moment that the essential operation of the Yankee drier machine of FIGURE 1 involves a divided press arrangement. The suction roll 9 is mounted with its suction area 9b at the oncoming side of the nip N–9 only so that it will permit the web W–1 to be pasted or stuck on to the surface of the Yankee drier 12, but the felt 11 at the off-running side of the nip N–9 does require additional conditioning and this is accomplished at the felt only nip N–2 where the outer peripheral or operating surface of the felt 11 is acted upon by the grooved roll 15 so as to draw water from the felt 11 in the direction of the grooves in the grooved roll 15 and a substantial portion of the water thus drawn from the felt 11 at the felt only nip N–2 is removed with fibers, clay, etc. which might have collected on the surface of the felt 11, and this material is then collected in the saveall 15g by the essential functions of the wiper w and the doctor d which will also be described in additional detail hereinafter. The conditioned felt 11 then passes into the dewatering web nip N–1 where water is pressed from the web W–1 through the felt 11 and into the grooves of the grooved roll 13 and these grooves in the grooved roll 13 tend to retain a substantial amount of such water at the off-runnning side of the nip N–1 and carry the water into the saveall 13g where it is removed from the grooved surface of the roll 13 by the wiper w and the doctor d.

At the off-running side of the nip N–1, however, a certain amount of water may return from the grooves to the felt 11 and the felt 11 is thus separated from the web W–1 as quickly as possible at the off-running side of the nip N–1 and the felt 11 is then passed through the second felt only press nip N–2a, where the grooved roll 15a functions substantially in the manner of the previously described grooved roll 15 in that it acts against the outer peripheral surface or operating face of the felt 11 to again dewater, clean and condition the same, although the grooved roll 15a is the upper roll in the felt only nip N–2a.

It will be appreciated that in FIGURE 1 the suction roll 9 described is preferred for some operations, but in many other operations it may be replaced by a simple plain roll which will paste the web W–1 on to the surface of the Yankee drier 12 or may be replaced by a blind drilled hole of the type known in the art and described in detail in Walker U.S. Patent No. 3,023,805; and in such instances the only suction roll employed in the Yankee drier machine 12 is the suction pickup roll which is not pressure loaded at the suction pickup position 8. The various pressure loaded rolls employed are all plain rolls (14 or 14a) or grooved rolls (15, 13 or 15a). The double-headed arrows indicate conventional pneumatic loading means and known anti-deflection roll mounting means for such rolls.

Referring now to FIGURE 4A and FIGURE 4, it will be seen that FIGURE 4A is a detail sectional view comparable to FIGURE 1A except that it is taken generally along the line Y—Y of FIGURE 1 at the nip N–1, so as to show fragmentarily the roll 12 and the roll 13, and the web W–1 (all in section), and the felt 11 in full view for simplification of the drawing.

It will be seen that the roll 13, like the roll 15 of FIGURE 1A is provided with substantially equally sized and formed grooves 13c and land areas 13b (which form the generally cylindrical peripheral surfaces of ridges also designated by the reference numeral 13b). FIGURE 4 is another fragmentary detail sectional view taken substantially along the line IV—IV of FIGURE 4A and FIGURE 4 shows the upper roll 12, the lower roll 13 (with parts shown in section and parts broken away), the web W–1 and the felt 11 (in full view, with an arrow indicating the longitudinal direction). The groove 13c is indicated in FIGURE 4 as part of the alternating generally circumferentially aligned ridges 13b and grooves 13c on the roll 13, but the detail of FIGURE 4 is taken of such a small overall portion of the press assembly that the curvatures of the rolls 12 and 13, as well as the bottoms of the grooves 13c are not emphasized. Referring to FIGURE 4B, however, it will be seen that the grooves 13c each have a very small or narrow axial dimension 16 at the mouth or peripheral portion thereof aligned with the generally cylindrical exterior surfaces 13b or land areas of the ridges, which ridge land areas have an axial dimension 17 that is shown in FIGURE 4B to be substantially the same as the axial dimension 16 of the grooves 13c at the outer periphery or mouths thereof. It will also be seen that the grooves 13c are defined between generally radial walls 13c–1 and 13c–2 which extend in generally parallel relationship spaced apart at least the axial dimension 16 for a substantial radial distance of their depth 16 which is greater than the axial dimension of the mouths of the grooves 16 and the axial dimension 17 of the land areas (in fact, being substantially twice either the axial dimension 16 or 17).

Referring now to FIGURE 6, it will be seen that there is shown a press assembly indicated generally by the reference numeral 20 in FIGURE 6 which is a significant improvement over the embodiments of the invention indicated hereinbefore at the nip N–2 of FIGURE 1. The view of FIGURE 6 appears to be reversed because it is taken from the opposite side of the machine from which the view of FIGURE 1 of the nip N–2 is taken. Since there are differences in the positioning of certain of the elements, the view of FIGURE 6 shows elements with different reference numerals. For example, the felt in FIGURE 6 is indicated as 23 (rather than 11) and as passing between felt rolls 24a and 24b (rather than 11e and 11q) and through the nip N–3 (rather than the nip N–2 of FIG. 1). The upper roll 21 is a plain roll like the plain roll 14 and the lower roll 22 is a grooved roll comparable to the grooved roll 15 at the nip N–2, but having a substantially superior land-to-groove structure, function and relationship. The essential features of the land-to-groove relationship of the roll 22 are shown in the fragmentary sectional views of FIGURES 5A and 5B. It will be appreciated that the section line VA—VA shown in FIGURE 6 indicates the section along which the view of FIGURE 5A is taken to show the relationship between the land and groove portions of the roll 22, and the view shown in FIGURE 5A also shows a felt in full view which is designated 23 and it shows fragmentarily the upper roll designated 21 in FIGURE 6.

In addition, however, in order to complete the theoretical consideration of the land and groove structure involved, an additional FIGURE 5C comparable to FIGURE 5A is shown and the view of FIGURE 5C actually represents a sectional view taken generally along the line Y—Y (and thus comparing with the view of FIGURE 4A) in FIGURE 1, after an essential change has been made in the device of FIGURE 1 by substituting the roll 22 for the roll 13 at the web press nip N–1. It will thus be seen that the views of FIGURES 5A and 5C differ *structurally* only in the inclusion of the web W–1 in section, although certain of the other elements which are functionally the same are given different reference numerals such as the felts 23 and 11, to indicate different locations in the machine.

Referring now more specifically to a consideration of the press assembly 20 of FIGURE 6 and the various views of the FIGURE 5 series, the press assembly 20 comprises an upper plain press roll 21 comparable in structure to the plain press roll 12, and a lower grooved press roll 22 comparable in some respects to the grooved press rolls 13 and 15 hereinbefore described. The press rolls 21 and 22 define a press nip N–3 which receives a moist felt 23 trained over guide rolls 24a and 24b. The grooved roll 22 is provided with a saveall indicated generally at 25 and shown with three sections 25a, 25b and 25c.

The grooved roll 22 is shown in fragmentary detail in FIGURES 5A and 5B (FIGURE 5A being taken substantially along the line VA—VA of FIGURE 6), and it will be seen that the grooved roll 22 is provided with a solid elastomer (rubber) cover 22a on an imperforate ductile iron shell 22x. The cover 22a may and preferably in certain cases (e.g. involving the use of a cooperating rubber covered plain press roll) is formed of stainless steel which will also permit the cutting of fine grooves 22c between land areas 22b, in the dimension and configuration shown in FIGURES 5A and 5B. Referring more specifically to FIGURE 5B, it will be seen that the cover 22a of the grooved roll 22 is indicated in a view without section lines for ease in detailing the description thereof. The grooves 22c are here shown having a substantially uniform axial dimension 26 that is 0.025 inch between generally cylindrical (smooth) land areas 22b on ridges alternating with the grooves 22c, with such land areas 22b having an axial dimension 27 that is 0.100 inch, or substantially four times the groove mouth axial dimension 26, thereby giving an open area on the surface of the grooved roll 22 of substantially 20%. The grooves 22c extend radially inward to a depth 28 of ⅛ inch (or 0.125 inch) which is greater than both the groove axial dimension 26 and the land area axial dimension 27, and such groove 22c is defined between generally radially extending, parallel walls 22c–1 and 22c–2, which are axially spaced the distance 26 of the axial groove mouth dimension or greater than that distance (by not more than about 100% because of the undesirability of under-cutting the land areas 22b), so that water entering the peripheral mouths of the groove 22c will not be restricted in its flow radially inwardly into the groove 22c.

Referring again to FIGURES 5A and 6, it will be seen that at the nip N–3 water is expressed into the grooves 22c from the felt 23 (and, by comparison in the view of FIGURE 5C water is expressed in grooves 22c from the web W–1 through the felt 11 at the nip) is received in the grooves 22c of the grooved roll 20 and to a substantial extent carried away from the felt 23b at the off-running side of the nip N–3. The first saveall section 25a is mounted in substantially the closest practical running relation with the off-running felt 23b and the off-running side of the roll 22 so as to capture droplets of water thrown by centrifugal force from the grooves 22c at the immediate off-running side of the nip N–3. The grooves 22c resist the tendency for centrifugal force to throw such droplets away from the roll 22, however, particularly at slower operating speeds. At higher operating speeds of 500 feet per minute and above, however, the tendency of the narrow grooves 22c to resist the release of water from the roll 22 because of centrifugal force is at least partly overcome and the saveall portion 25a functions to minimize rewetting of the underside of the felt 23, in this respect.

A substantial amount of water, however, remains entrapped in the narrow grooves 22c in the grooved roll 20 until this roll passes past a wiper 29, which is unique in its simplicity (and is indicated diagrammatically merely with reference letter "W" in other views), consisting merely of a generally flat sheet of moderately resilient material such as metal sheet 29a secured to a transverse cross bar 29b and urged as a continuously transverse sheet against the land areas 22b on the periphery of the roll 22. The wiper sheet 29a thus does not enter into the grooves 22c but merely presents a surface that is axially continuous for the transverse peripheral dimension of the roll 22 along the generally transverse line of contact L–1 (i.e. actually a limited peripheral area of contact), whereat the wiper 29 extends axially continuously from the off-running side of such line of contact L–1 so as to separate or diverge slowly from the off-running periphery of the grooved roll 22 so as to effect, by pumping action, a drawing of the water out of the grooves 22c (which is actually swept out of the grooves 22c by air (at A–7) rushing in to fill the partial vacuum created by the pumping action of the wiper 29). The water in the grooves which has been held therein in resistance to the combination of centrifugal and gravitational forces at the down-running side of the grooved roll 22 is thus substantially swept out of the grooves 22c and to a substantial extent into the second, bottom saveall portion 25b.

Some of the water thus drawn from the grooves 22c remains on the land areas (as a meniscus), and the mist or droplets of water generally present in the immediate vicinity of high speed press rolls in paper machines will also tend to deposit on the land areas 22b of the up-running side of the grooved roll 22, and such water on the land areas 22b is then removed by a conventional doctor means, preferably merely in the form of a conventional doctor blade 30 (which is indicated diagrammatically merely by the reference letter "d" in other views), which at high speeds will actually throw water droplets away from the roll surface as indicated in FIGURE 6 and against the third saveall portion 25c feeding into the bottom saveall portion 25b. The doctor blade 30 thus provides a doctor means in close proximity to the oncoming side of the nip N–3 to dry the land areas. Preferably the doctor means 30 coacts with the land areas 22b within what constitutes at least the last 120°, and preferably the last 90° of travel of the grooved roll 22 approaching the nip N–3, so that the land areas 22b will be dry at the immediate oncoming side of the nip N–3. If some droplets of water are driven by the doctor 30 from the land areas 22b into the bottoms of the grooves 22c, it has been found that the particular function of the grooved roll 22 is not significantly impaired, whereas retention of moisture on the land areas 22b does make a significant difference in the operation of the grooved roll 22, for reasons which will be described in detail hereinafter.

*Theory and advantages of invention*

As previously indicated, certain aspects of the embodiment of the invention shown in FIGURE 6, and FIGURES 5A, B and C, involve significant and distinct improvements over the embodiment of the invention originally shown in FIGURE 1; and although it is not desired to limit the invention to any particular theory, it is believed that certain theoretical considerations will explain the superiority of the embodiment of FIGURE 6, and particularly the roll 22, over that of FIGURE 1, and specifically the rolls 13 and 15, and such considerations will also explain the superiority of the embodiments of FIGURE 1. In this connection, it will be appreciated that FIGURES 5A and 5C will usually be considered jointly in the theoretical discussion hereinafter, because the essential functions of water travel are comparable therein, even though FIGURE 5A refers to a felt only nip N–3 and FIGURE 5C refers to the improved and modified web nip N–1 using the roll 22 in place of the roll 13.

Grooved rolls in the art of pressing paper webs were considered and discarded several generations ago. For example, in 1915, U.S. Patent No. 1,123,388 issued to Schaanning and was directed to a grooved press roll allegedly intended to replace felt covered rolls and having grooves of such configuration that Schaanning alleged that they would retain water by capillary action. As early as 1905, Fletcher (U.S. Patent No. 800,845) proposed a grooved roll made of certain segmental portions. In the 1920's, Goodfellow (U.S. Patent No. 1,369,335) proposed a press roll with circumferential grooves as well as generally axial grooves interrupting the circumferential continuity of land areas, which were covered with the felt; and Wagner issued U.S. Patent 1,483,562 relating to grooved rolls used with a pair of press felts for cooperation with certain suction mechanisms outside of the press rolls. Wagner U.S. Patent No. 1,321,956 shows grooved rollers in a couching mechanism. Wagner U.S. Patent No. 1,520,489 relates to a grooved jacketed roll. Wagner U.S. Patent No. 1,517,036 relates to a pair of press rollers intended to press a traveling paper web with their bare unprotected surfaces, with one of such rollers having grooves in the surface thereof.

As late as 1958, however, Wagner issued U.S. Patent No. 2,858,747 which was directed to grooved press rolls functioning with a suction device mounted outside of the roll shell; but with occasional exceptions such as this in the patent art, it will be found that substantially the entire paper making industry devoted its attention to the perforate shell type of suction roll for water removal at a press nip, once this structure was discovered and introduced in the industry. In fact, for the past thirty or forty years the drilled perforate shell type suction roll has been used predominantly and practically exclusively in the paper making industry for the removal of water in any significant quanties from moist paper webs in paper making machine press assemblies.

As indicated in FIGURE 2 hereof, in the suction press nip N–4, the roll shell 31 is "perforate," being provided with a multiplicity of holes 32, 32 of substantial size (i.e. at least about ¼ inch in diameter and usually having flared peripheral mouths 32a of greater size) which are drilled entirely through the roll shell 21 (having at least about 1 inch thickness) to communicate with the suction gland G_S extending the full width of the roll shell 31 interiorly opposite the nip N-4. At the suction press nip N-4, a press felt 33 is interposed between the web W-2 and the perforate suction roll shell 31 (primarily as a water-permeable protective layer for the web W-2), and water expressed from the web W-2 passes completely through the felt 33 and into these holes 32, 32 in the perforate shell 31. Some water continues into the gland G_S and some is usually retained in these holes 32, 32 at the off-running side of the nip N-4, where the subatmospheric pressure in the gland G_S tends to counteract centrifugal forces urging water droplets back out of the holes 32, 32 and against the felt 33 under ambient atmospheric pressure. The felt 33 may thus remain in contact with the web W-2 at such off-running side of the nip N-4 without substantial rewetting of the web W-2 (via water thrown back on the felt 33 from the suction roll holes 32, 32). Also, saveall (not shown) are conventionally positioned between the felt 33 and the perforate roll shell 31 at the immediate off-running side of the gland G_S to catch droplets released from the suction roll holes 32, 32 particularly after these holes pass beyond the limit (i.e., the off-running seal, not shown) of the interior suction gland G_S so there is no longer a pressure differential holding the droplets in the holes 32, 32. The off-running felt 31 must be guided to avoid such saveall and this often results in guiding the felt with or against the web at the off-running side of the nip N-4. The perforate suction roll with its suction gland, and with or without the saveall, thus functions to carry away substantially all of the water expressed from the web at the nip.

In spite of the excellence of the performance of perforate suction rolls for a number of uses in paper making, it must be conceded that these rolls and their auxiliary equipment are expensive to manufacture. The suction gland therein, also, substantially precludes the use of conventional anti-deflection roll structures for greater versatility and uniformity in nip pressure control. In addition, the substantial size of the perforation mouths 32, coupled with the pressure differential created by the suction gland against the unsupported portions of the felt 33 opposite such perforations 32, has a tendency to cause "shadow marking" of the web in certain instances.

Only in recent times, after many years of commercial use of perforate suction rolls, there has been developed what is known as the "divided press" type of structure which does not require the use of the perforate suction roll at the web press. In the divided press, the felt alone is cleaned, dewatered and conditioned at a separate press nip, and then fed with the moist web into what is called a "web" nip which is defined between rolls having imperforate shells (as contrasted to the perforate suction roll shells). As indicated in FIGURE 3, ordinarily the amount of water load at such a "web" nip N-5 is such that at least one of the press rolls 35, 35a is provided with recesses 36 on the surface thereof to temporarily take the load of water entering the web nip N-5 to prevent "crushing" of the web W-3 carried by the felt 37. As indicated in FIGURE 3, a preferred form of such recess 36 is provided by a rubber cover on a press roll 35 that contains a myriad of comparatively fine blind drilled holes (i.e. of approximately 1/16 to 1/4 inch or even less diameter, as in the case of Walker U.S. Patent No. 3,023,805); and such fine holes 36, 36 will in the case of most conventional webs W-3 and felts 37 substantially avoid or eliminate the "shadow marking" characteristic of the performance of certain perforate suction rolls. In the divided press, the water removal principle is substantially different. The water is not carried away from the nip N-4 by the suction roll shell 31 and, instead, the water pressed from the web W-3 into the felt 37 is carried away from the web W-3 substantially entirely by the felt 37 at the off-running side of the nip N-5. Excess water at the nip N-5 which is driven into the blind hole perforations 36, 36 to relieve the load at the nip N-5, ordinarily entraps a certain amount of air in the bottom of these blind perforations 36, 36 and this, coupled with the ability of the felt to absorb water when it expands at the off-running side of the nip N-5, results in a substantial removal of water from the system via the felt 37 which, as previously mentioned, is then passed through a felt only press where it is dewatered to the extent desired at a separate press nip. The principle of the water removal at the web press nip N-5 of the divided press also involves what amounts to a comparatively good force balance at the nip itself, whereat the web W-3 is squeezed so that it is dewatered but it is squeezed against a felt 37 that is maintained on a substantial amount of land area 36a in between the mouths of the myriad of perforations 36, 36 and the perforations 36, 36 are filled with water under a considerable amount of pressure (particularly when air is entrapped in the bottom of the blind holes 36, 36) so that the bridging or unsupported felt areas at the nip N-5 corresponding to perforation openings of as much as 1/8 or 1/4 of an inch in diameter are actually very well supported from beneath and there is little significant evidence of lack of support for such felt areas in the resulting pressed web W-3 ordinarily (i.e. little, if any, evidence in the form of "shadow marking"). In addition, the imperforate shells 35, 35a effectively defining the web press nip N-5 of such construction that they lend themselves readily to support by various anti-deflection means, so that the web press N-5 is afforded substantial advantages in versatility of nip pressure control and maintenance of generally uniform axial nip load.

The instant invention, however, as exemplified in the embodiments of FIGURES 4, 4A and 4B, as well as the improvements thereon represented in FIGURES 5A, 5B and 5C is based upon still another different and distinct fundamental principle of water removal at press nips. For one thing, the instant invention provides a unique improvement in the divided press assembly (FIG. 1) whereby a grooved roll 13 (or 22) is used at a web press N-1 in the place of the prior art press rolls such as the roll 35 described in connection with FIGURE 3 so as to obtain either a number of distinct advantages over the divided web press structure just described (at some sacrifice in other advantages), or to obtain all of the advantages of the divided press just described, plus a number of additional advantages.

One of the essential concepts of the instant invention involves that of using a grooved roll with land areas 13b and 22b (of the FIGURE 4 and FIGURE 5 series) that are substantially circumferentially continuous so that the land areas present continuous generally cylindrical, smooth exterior or peripheral outer operating surfaces for engaging the web material or felt 11, 23 and supporting the same. Circumferentially discontinuous land areas are substantially impossible to clean during rotation of the roll. Also essential in consideration of this first concept in the use of such land areas having a very narrow axial dimension 17, 27 between the alternating grooves 13c, 22c which are also of small axial dimension 16, 26 but which are vented (peripherally) to ambient atmosphere so that water pressed at the press nips, N-1, N-2 and N-3 will have no resistance in this respect to flow through the web material or felt axially as well as radially and into such vented groove mouths (which are wide enough to readily receive the water under pressure). The grooves are provided in a size of sufficient magnitude to receive the water load at the press nip, while being vented to ambient atmosphere and thus in a manner so as not to resist flow into the grooves, by virtue primarily of the groove depth (as comprised to increased groove axial dimensions 16, 26 to accommodate increases in water load). The groove depth 18, 28 in most paper machine uses must thus be substantially greater than the groove opening 16, 26 at the roll periphery, so that the very essential venting function is accommodated. In practical embodiments of the instant invention, the ratio of groove depth 18, 28 to groove axial dimensions 16, 26 at the roll periphery is preferably at least about 2:1 and may be as much as about 10:1 or more depending upon practical, additional consideration such as roll strength, ease of cutting the groove, etc. In addition, it has been found important to make sure that the groove is able to readily receive the water load in that it is provided with side walls 13c–1, 13c–2 or 22c–1, 22c–2 which are (generally radially aligned) at least as far apart axially as the groove mouth 16, 26 for at least an initial groove depth substantially equal to the axial dimensions of 16, 26 of the groove mouth (or a minimum of about 0.05 inch, and preferably ⅛ inch) and preferably for substantially the entire groove radial dimension 18, 28. It will thus be seen that a minimum groove cross-sectional area may be computed as $2x^2$ on the basis of the example of 0.025 inch groove width "$x$" and 0.05 inch groove depth, although a greater area is preferred in the neighborhood of $5x^2$ for a depth of 0.125 inch. This concept would permit interior groove axial dimensions greater than the mouth axial dimensions 16, 26, if the forming of the same is practical and does not subtract from the strength and other commercial considerations such as cleaning of the roll, but this concept would preclude shallow tapered grooves which would be intended to resist the entrance of water therein (and/or the venting thereof) but a taper between the walls of relatively deep grooves, such that the walls would be functionally parallel (for the operating purposes described) in the region of the groove mouths would not be precluded.

In addition to the ability of the grooves 13c and 22c to vent to ambient atmosphere at the press nip and thus readily accommodate the receipt of water, an even more important consideration has now been found to be a part of this concept, and this is the consideration which involves the use of a minimum axial dimension 17, 27 to the smooth generally cylindrical land area on the ridges between the grooves. As indicated in FIGURE 5B, the maximum axial distance which water must travel through the felt 23 (in compressed form) is from approximately the midpoint M of the land area 22b to the edge of the groove 22c adjacent thereto. Such midpoint M lies in a generally radial plane bisecting the individual ridge and land area 22b and the axial distance 27½ to the groove is approximately ½ of the land area 27.

Liquid per se in any medium, such as water in the web type of medium provided by the felt 23, resists flow under any circumstances, and in the compressed felt 23, which has a dimension within the range of about ¹⁄₁₆ to ⅛ inch (0.0625 to 0.125 inch) the resistance to water flow is sufficiently great to cause considerable care to be taken in defining this dimension 27½ so as to maintain maximum dewatering efficiency at the nip. In this respect, the axial land dimension 17, 27 should be about 25% to 200% of the radial felt thickness 23aa in compression for the best performance in water flow axially laterally through the compressed felt and into the grooves 22c on either side of each land area 22b (that is contacted, touched or, in the language of the art "covered" or "wrapped," by the felt). Preferably the range of axial land dimension 17, 27 to felt thickness 23aa in compression is within 1:2 to 1:1.

Still another important consideration in the practice of the instant invention with respect to the axial groove dimension 16, 26 at the mouth thereof is that of "shadow marking" in the case of webs passing through the nip. It will be appreciated that shadow marking per se is not of any consequence in connection with a felt only press, nor is it a significant factor in the case of certain types of lower quality webs or in the case of certain paper machines wherein extra heavy felts are used. In such instances, it might be possible to use grooves having substantial axial dimensions 16, 26 up to as much as about ⅛ inch, above which the felt would tend to enter the grooves to too great an extent, causing unnecessary additional wear of the felt, possible plugging of the water flow and/or venting effect, etc. A careful study of this matter has revealed, however, that axial groove dimensions 16, 26 which are significantly greater than about 0.035 inch tend to cause undesirable marking on certain webs and/or the undesirable temporary entrance of the felts of most weights into the grooves under the nip load, so as to increase the wear of the felts; and a maximum groove dimension of 0.035 has been found to be a very significant cutoff point for most pressing operations. The minimum practical axial groove dimension 16, 26 which accommodates receipt of water and the essential venting function, is in the neighborhood of about 0.005 inch. As previously indicated excellent results are obtained using a groove axial dimension of substantially 0.025 inch, although more recent work demonstrates a distinct preference for 0.020 inch.

The foregoing venting concept which is essential to the practice of the instant invention is based upon certain fundamenal theories which involve the design of grooves having the best ability to receive water and vent the nip pressure, plus the design of land areas having superior ability to effect axial or transverse flow of water through the compressed felt and into the grooves with a minimum amount of interference and a minimum amount of pressure gradient across the land areas. In the case of a web nip such pressure gradient is a function of the fluid pressure existing at the interface between the felt and the web, and it is important in pressing to vent or relieve such fluid pressure in the felt to as low a level as possible, which is best done by opening up the "back side" of the felt so that water need travel only substantially the thickness of the felt in compression to ambient atmosphere in the grooves.

Another aspect of the instant invention which has been found to be very important is that of minimizing such flow of water through the compressed felt and into such grooves, by preparation of the land areas at the oncoming side of the nip. In this respect, attention is directed to FIGURE 7A, which shows in a transversely directed view the outer peripheral land areas 22b alternating between the grooves 22c but with droplets D of water (in the form of a meniscus) adhering to the land areas 22b. It will be appreciated that in the operation of paper machinery involving press sections, a substantial amount of water is being handled and this water includes droplets in mist in the air as well as the water actually remaining in droplet form on the roll surface, so that the roll surface ordinarily tends to be continuously wet. It must be appreciated, however, that any such droplet D carried on the land areas 22b into the nip N–3 (or N–1, N–2) is first immediately pressed into the body of the felt and then must travel the aforesaid axial dimension through the compressed felt and into the vented grooves on either side of the land area 22b. This is a phenomenon which is avoided in accordance with the practice of the instant invention by a very simple expedient. In FIGURE 1, the doctor means d (in the form of the doctor 30 of FIGURE 6) wipe such droplets off the land areas to dry the same at the oncoming side of the nips N–2, N–3 (within at least approximately about 120° at the oncoming side of the nip on the grooved press rolls, and preferably within substantially the last quarter or 90° of rotation of the grooved roll approaching the nip). Although an "air" doctor could be used, the press assembly 20 of FIGURE 6 demonstrates the use of a more simple, sturdy, inexpensive and advantageous doctor means for accomplishing the result desired with greater ease, and without the necessity of atomizing or blowing droplets into the ambient atmosphere for redeposit on other operating members.

This is done essentially by the use of the doctor blade 30 which is a conventional doctor blade in all other respects and has this advantage. It is mounted, however, at the immediate oncoming side of the nip N–3 so as to make sure that the land areas 22b are dry approaching the nip N–3. In this respect, it will be seen that the doctor 30 which presents what constitutes an axially continuous surface urged against (or in very close running relation to) the roll periphery is a greatly simplified structure in that it is not complicated by devices for reaching into the grooves 22c.

An important aspect of the invention resides in the fact that devices for reaching into the grooves 22c at this particular location are not essential, since the grooves 22c are designed with sufficient depth 28 to accommodate the return of at least a small amount of water into the nip N–3 in the grooves without interfering with the overall operation of the press 20. The important point to consider here is that of avoiding an unnecessary additional flow of water axially through the compressed felt by the introduction of water at the land areas 22b at the nip N–3.

Still another very important point to consider is that in the press roll 22 which is the preferred embodiment of the instant invention, the generally circumferential, alternating grooves 22c and ridges 22b are in the form of continuous spirals, as contrasted to *exactly* circumferentially aligned and axially spaced grooves and ridges throughout the entire roll periphery. This latter roll structure can be used in the practice of the instant invention with a number of desirable results, and the spiral grooving is distinctly superior from the point of view of manufacture and use as will be demonstrated hereinafter. Machine tools are available for cutting the desired grooves (in the form of spiral threads) on the surface of such rolls with considerably greater ease and accuracy than can be done in the practical shop operation involving the cutting of grooves that are exactly circumferential. Moreover, the doctor 30 presents an axially continuous surface which is uniquely capable of cooperating with the spiral grooving for dewatering the land areas only, whereas any device reaching into the grooves of spiral grooving could not be retained as a fixed, simple functioning device such as the instant doctor 30.

Referring now to FIGURE 7, it will be seen that the wiping device 29 also provides a unique arrangement for dewatering grooved rolls generally, and particularly for dewatering the spiral groove rolls of the type just described. The wiping device 29 does not enter into the grooves 22c, but carries out its function of pumping water from the grooves 22c by virtue of its unique, simple structure and it carries out this function at the oncoming side of the doctor 30, so that it will not take water from the grooves 22c and put it on the land areas 22b such that the water will be conveyed into the nip N–3 on such land areas. In essence, the wiper 29 has an axially continuous surface portion 29a extending from close proximity to (actually being urged against) the roll surface 22 at the peripheral surface portions or land areas 22b thereof, which surface portion 29a extends gradually away from such roll surface or land areas 22b (from the region of contact L–1) so as to define with the off-running roll periphery a gradually diverging pair of surfaces for pumping liquid out of the grooves 22c as it moves past the wiper means 29. As indicated in FIGURE 7, the combination of centrifugal force, gravitational force and the reduced atmospheric pressure that is created at the underside 29c of the sheet 29a for the wiper 29 results in the drawing of the water (indicated at 29c diagrammatically) out of the grooves 22c and off in the general direction of the underside 29c of the sheet 29a. This is done, of course, to an appreciable extent by the sweeping or inrushing of air A–7, as indicated diagrammatically, along the peripheral surfaces of the grooves 22c to compensate for the partial vacuum that is being created by this pumping effect. It will be appreciated that the wiper structure thus shown is unique in its simplicity, ease of assembly, installation, operation, repair, etc., and in addition it is unique in its function with respect to generally spiral grooves 22c in that it will dewater the same without reaching into such grooves and thus having the inherent axial travel motion imparted to the wiper device 29 that would result from continuously riding in spiral grooves. It has been found that the fundamental and simple wiper 29 and doctor 30 structures cooperate in a unique manner in connection with the press assembly 20 for obtaining the best operating results. The doctor 30 per se has the unique function of improving the efficiency of the press at the nip N–3, and the wiper 29 per se has the unique function of drawing water out of the grooves 22c by a very simple structure and phenomenon. Both of these devices 29 and 30, individually and in combination, are uniquely superior for operation with the preferred spirally grooved press roll in improving the basic operation thereof.

In addition to the previously mentioned advantages of spiral grooving on the roll 22, which include the more inexpensive and foolproof cutting of such rolls on a lathe, there is a unique cooperation between the spiral land areas 22b and the doctor 30 and/or wiper 29 which is not injurious to the felt 23. At the nip N–3 the spiral grooves 22c and ridges 22b come into momentary contact with the felt 23 under compression (moving truly circumferentially) and for such momentary contact the grooves 22c and ridges 22b are substantially (and practically) circumferentially aligned in their travel and the axial extent of the travel is so extremely minute that no felt damage is caused thereby. Just the opposite function between the ridges 22b and the doctor 30 and/or wiper 29 is obtained, however, because these latter devices remain in fixed position engaging the ridges 22b so that their spiral (axial motion) component has the net effect of continuously cleaning, wiping and/or scraping the engaged surfaces of the doctor 30 and/or wiper 29.

In many respects, the foregoing structures of the grooved rolls 13 and 22 are particularly useful even though the groove mouths 16, 26 may be rather substantial in size (e.g. up to 0.1 inch or more at the felt only nip N–2), even to the extent of causing some "marking" at the web nip N–2 (using the additionally smoothing nip N–1a). In the preferred embodiment of the instant invention, however, marking is avoided by the use of very narrow groove openings 16, 26, of an axial dimension that is not greater than about 0.035 inch (and preferably about 1/32 inch). This axial dimension, as a maximum, has been found to be distinctly superior for use in the practice of the instant invention. It has been found that axial dimensions significantly greater than this do not give significantly better performance in any of the ordinary uses of the instant roll, whereas such bigger axial dimensions do have a tendency to cause web marking in most instances. In the manufacture and sale of grooved press rolls for the uses contemplated in the practice of the instant invention, it has thus been found particularly desirable to maintain groove axial dimensions of 0.035 or less. Among other things, this has the advantage of avoiding any special instructions in connection with mill use of the grooved rolls, since such grooved rolls can be used at felt only presses, as well as web presses involving different felt weights and different qualities and types of webs.

Within the limitations hereinbefore set forth, it will be understood that certain relationships between the grooves and ridges in the felt covered press roll (e.g. 13 of FIG. 1) of a web press N–1 in a divided press may not be so critical because the felt 11 is adapted to carry away most of the water expressed from the web W–1 and re-wetting of the web is avoided in FIGURE 1 by guide means separating the web and felt at the immediate off-running side of the nip N–1. The ratio of axial groove dimension 16 to axial land dimension 17 is at least about 1:1 and preferably at least within the range of 1:1 to 1:3 (i.e. 1/32 inch to about 1/16 to 3/32 inch) for satisfactory removal of water from the web, which involves an open area range of 50% to about 25%.

Extensive research has revealed, however, that distinctly superior performance is obtained using a substantially smaller open area of not more than about 25% (e.g. not more than 1/32 inch grooves with 3/32 inch lands). This is a significant difference between the rolls 13 and 22. This is notwithstanding the fact that an essential aspect of the invention involves ease of reception in the grooves of substantial quantities of water. The reason for the preferred open area upper limit of about 25% (and preferably 20% with the 0.025 inch grooves and 0.100 lands of FIGURE 5B) is that it has been found that this comparatively low open area does not significantly impede water removal from the web (via the felt) at the nip pressures used while it does carry out perhaps the second most important function that provides great versatility for the grooved roll of the invention. This function is that of minimizing re-wetting of the felt at the off-running side of the nip N-3. Although this function greatly assists the dewatering operation in the web (divided) press nip and reduces or minimizes the water load carried away by the felt from the web in the divided press, it is actually capable of effecting substantially all water removal (via the grooved roll at a web press nip) so as to replace a conventional suction roll web press, as indicated in FIGURE 5C.

In FIGURE 6, it will be noted that the felt 23 is aligned substantially at (or preferably slightly above) a nip-tangent plane T—T at both the oncoming 23a and off-running 23b sides by means of the upper surfaces of the guide rolls 24a, 24b which are positioned on the side of the tangent plane T—T opposite the roll 22 so that the felt 23 will have minimum contact with the roll 22 (only at the nip N-3), will not tend to have portions entrapped in the grooves 22c, will not tend to close off ambient atmosphere at the oncoming or off-running sides of the nip N-3, will undergo minimum wear from contact with the land edges (e.g. at 22b-1 of FIGURE 5B which are preferably rather sharply cut to obtain the other advantages described herein), will undergo minimum wear from the limited axial movement of the spiral lands 22b at the nip N-3, will permit the proper positioning of the saveall 25, and will withdraw or receive a minimum amount of water from the grooves 22c at the off-running side 23b of the nip N-3. The grooves 22c, of course, resist release of water by centrifugal force (particularly more at the up-running or top of the roll 22 than at the down-running side when gravity adds to the centrifugal force) but whatever is released (at D-3) is substantially thrown against the upper part of the saveall 25a at the immediate off-running side of the nip N-3 between the roll 22 and the felt 23b.

Although the travel of the felt 23b at the off-running side is important for many uses, the open area is still very important because some re-wetting of the felt 23b at the off-running side of the nip N-3 is almost instantaneous as the felt expands when the nip pressure is released and the felt is then very absorptive. At this instant the water "path" is reversed back out of the grooves 22c toward the more remote portion of the absorptive felt 23, which would be along the center line or plane M (FIGURE 5B) above each land 22b. It has now been found that in the preferred structure of the roll 22 this reversal of water travel is minimized by the use of a ratio of groove width 26 to land width 27 of a practical minimum of 1:3 to a practical maximum of about 1:20 below which dewatering of the web and/or felt is unduly hampered at the press nip N-3 (and preferably an open area from about 25% to about 10% for practical purposes).

Particularly using the combination of the foregoing (groove-to-land) ratio of 1:3 to 1:20, lands of substantially 0.05 to 0.15 inch width, and grooves of 0.01 to 0.035 inch width, one obtains an unusually versatile press roll for use throughout a press assembly (e.g. at any and preferably all of the grooved roll positions indicated in the drawings hereof). Excellent results have been obtained using substantially the exact dimensions disclosed for the roll 22 (i.e. 0.025 but preferably about 0.02 inch grooves with about 0.1 inch lands). Groove depths 28 at least sufficient to carry the water load are used, and preferably the foregoing combination includes (substantially radial) groove depths of at least about 2 to 10 times the groove width, at least about equal to the land width, and at least about 0.1 inch, with a maximum groove depth being defined primarily by practical considerations, although square or rounded groove bottoms not substantially deeper than about 1/4 inch are generally superior to other structures for the combination of strength, cleaning and manufacturing purposes.

It has already been indicated that the embodiment of FIGURE 1 may be greatly improved by replacement of the felt only press nip N-2 with the structure of the felt only press nip N-3 of FIGURE 6, and it has further been indicated that the embodiment of FIGURE 1 may be greatly improved by the replacement of the grooved roll 13 with a grooved roll of the structure of the grooved roll 22 (i.e. with presently preferred forms having 0.020 inch grooves with 0.080 lands for 20% and 0.020 inch grooves with 0.105 lands for 16% open areas, respectively). It will further be noted that the embodiment of FIGURE 1 may also be greatly improved by replacement of the second felt only nip N-2a with the felt only nip structure N-8 shown in FIGURE 8 hereof.

Referring now to FIGURE 8, it will be seen that this embodiment of the invention indicated generally by the reference numeral 20 shows a felt press wherein the press nip N-8 is defined between an upper grooved roll 42 and a lower plain roll 41 which engages the felt F-11 at the outer peripheral surface thereof. Elements in FIGURE 8 corresponding to those shown in FIGURE 6 have been designated by the same reference numeral in the 40 series. It will be seen that the bottom plain roll 41 may have a tendency to carry away a slight amount of water from the felt F-11 and the roll 41 is cleaned by a doctor 41a at the oncoming side of the nip N-8, with the doctor dumping water and the like into a saveall 41b. The grooved roll 42 has substantially the same structure as the previously described roll 22, except that the groove width is preferably only about 0.015 inch (with 0.085 inch lands) for an open area of 15%, and the press 40 is used for removing a relatively nominal amount of water as well as reconditioning the felt F-11. The reduced open area minimizes rewetting of the felt F-11 at the off-running side of the nip N-8. The saveall portion 45a at the off-running side of the nip N-8 extends between the felt F-11 and the surface of the roll 42 to substantially the immediate off-running region of the nip N-8, and collects some droplets of water as indicated diagrammatically.

At the downrunning side of the grooved roll 42 a wiper 49 having substantially the structure of the wiper 29 and a doctor 50 having substantially the structure of the doctor 30 are mounted for cooperation, with a saveall portion 45c. The saveall 45c carries the doctor 50 as close to the oncoming side of the nip N-8 as is practical for permitting the saveall 45c to collect and withdraw water wiped from the lands 42b of the roll 42 by the doctor 50. In addition, a second doctor 49c is mounted in cooperation with the wiper 49, as indicated in the view, so as to wipe the land areas clean at the immediate approach to the wiper sheet 49a and thus permit the wiper sheet to carry out its pumping function more effectively and without interference from water being carried against the same by the land areas on the roll.

Referring now to FIGURE 9, it will be seen that another embodiment of the instant invention is shown wherein parts corresponding in structure and function to the parts previously described are designated by the same reference numeral in the 100 series. Thus the Yankee drier is designated 112 and the creping doctor for removing the web W-101 is designated 112a. The essential cycle of the suction pickup felt 111 is shown from the suction pickup roll 108 to the suction nip designated N-10 for the suction roll 109, but the felt 111 then is guided by appropriate felt guide rolls 111c, 111d, 111e, 111f, with the tensioning roll 111g through a felt only press N-12a which functions much like the previously described felt only press N-2a to recondition the felt for the suction pickup function. The general structure of the felt only press nip N-12a is, however, that shown in FIGURE 8 and the comparable parts are indicated by the same reference numerals in the 100 series, where appropriate.

In connection with the second nip N-11 which the web W-101 passes through on the Yankee dried 112, it will be seen that a plain press roll 116 wrapped by a felt 117 defines such nip N-11 for dewatering of the web W-101 primarily only by transfer of water from the web W-101 to the felt 117, which is separated rapidly from the web W-101 at the off-running side of the nip N-11 in the manner employed in a divided press via the guide roll 117a. For purposes of simplification the overall felt run 117 is abbreviated and shown only with guide and tensioning rolls 117a, 117b, 117c and 117d. It will be seen, however, that the guide rolls 117b and 117c serve to maintain the felt 117 generally tangential to the plain press roll 116 and a grooved roll 122 defining a felt only press nip N-12 therewith on the side of the plain roll 116 substantially opposite to the web press nip N-11. The grooved roll 122 has the structure previously described for the grooved roll 22 with auxiliary equipment so indicated. The advantage of the arrangement of FIGURE 9 is that the use of the felt covered plain press roll 116 permits dewatering of the web W-101 of even the most delicate lightweight tissue types of webs with a minimum opportunity for damage to the web and also the cooperation between the three rolls 112, 116 and 122 affords a three roll divided press assembly, thereby employing one less roll than would be used in the four roll type divided press assembly indicated in FIGURE 1.

Referring to FIGURE 10, it will be seen that a somewhat different Yankee drier machine is shown therein. For example, the web W-201 is taken from a forming wire W-200 traveling over a couch roll 207 around a guide roll 206 through a short open draw and on to a bottom felt 205 carried on guide rolls 205a and 205b over a grooved roll 222 having the structure of the previously described grooved roll 22, but with an open area of about 25%. The groove roll 222, however, defines a dewatering as well as a web transfer nip N-20 with a suction press roll here designated 208 in a conventional saveall 208a wrapped by a felt 211. The web W-201 is thus transferred to the underside of the felt 211 at the transfer nip N-20 and then travels on around a blind drilled rubber covered roll 209 of the type previously described and at a nip N-29, the felt wrapped blind drilled roll 209 pastes the web W-201 on to the surface of the Yankee drier. The felt 211, however, continues to hold the web W-201 on the uprunning side of the surface of the Yankee drier 212 as the felt 21 passes through a press nip defined by a second grooved roll 220a, at a nip 21, and the felt 211 continues with the web W-201 on the surface of the Yankee dried 212 until it passes through still a second nip N-21a defined by a plain press roll 212b. The felt 211 then returns to a felt only press nip N-22a defined by a press couple 240 having the structure previously described for the press couple 40 of FIGURE 8. The felt 211 is thus reconditioned at the felt only press nip N-22a and returns via appropriate felt guide rolls 211a, 211b, 211c, etc. back to the transfer nip N-20.

It will be appreciated that the use of the open draw in the embodiment of FIGURE 10 is exemplary as another example of the versatility of the use of the various grooved rolls in the invention, but it will further be appreciated that a conventional suction pickup arrangement with the felt 211 may be used as indicated in previous figures. An advantage of the operation of the felt 211 in continuously engaging the web W-201 for most of the uprunning travel on the uprunning side of the Yankee drier 212 is that the felt 211 may afford the desired protection for certain specific types of webs while still permitting the grooved roll 222a to effect substantial dewatering of the web W-201 without causing any web damage. This is done by using a grooved roll 222a having substantially the structure of the grooved roll 22 hereinbefore described but having a rather limited open area of 15% to 20%. The auxiliary saveall 225a and other equipment for use with the roll 222a has already been described.

Referring now to FIGURE 11, it will be seen that parts shown in FIGURE 11 corresponding to parts previously described in FIGURES 1 and 9 are given the same reference numeral in the 300 series. The felt 311 picks up the web W-301 at the suction pickup roll 308 and conveys the same to the first suction nip N-39 formed by the suction roll 309 which pastes the web W-301 on to the uprunning surface of the Yankee drier 312, where the web W-301 remains as it passes through a web press nip N-31 defined by a grooved roll 322 wraped by the felt 311. The felt 311 then passes around the felt guide roll 311f and through a felt only nip N-32a that is defined by a press couple 340 having the structure of the press couple 40 previously described, so that the felt 311 is reconditioned for the suction pickup function. The grooved roll 322 has the structure of the previously described grooved roll 22 with an open area of approximately 20% and it is backed by a second grooved roll 322a having substantially the same structure but defining therewith (and with the Yankee drier 312) a three roll divided press assembly. It will be seen that the felt 311 passes between these two grooved rolls 322 and 322a substantially tangential thereto at a felt only nip N-32 and both of these grooved rolls will remove water from the felt and condition the same in the manner hereinbefore described and the water thus removed is taken from the grooves thereof by the wipers previously described and doctors d are employed at the oncoming sides of the nips N-32 and N-31 in the manner previously described so that the conditioned felt 311 may then pass through the web nip N-31 again substantially tangential to the Yankee drier 312 and the grooved roll 322 for best operation.

Referring now to FIGURE 12, it will be seen that parts shown in FIGURE 12 which correspond to the parts previously described in FIGURES 1 and 6 are designated by the same reference numerals the 400 series. It will be seen that the web W-401 is pressed last at the web press N-41 by a grooved roll 422 which is wrapped by the felt 411, and the grooved roll 422 has the structure of the previously described grooved roll 22, except that it is operated with a minimum open area of about 15% so that there is a minimum re-wetting of the felt 411 at the off-running side of the nip N-41 and substantially all of the water taken from the web W-401 at the nip N-41 is retained in the grooves of the grooved roll 422 and captured in the saveall 425 therefor. This arrangement thus permits the elimination of a subsequent felt only press for reconditioning the felt prior to suction pickup at the suction pickup roll 408.

In addition to the foregoing advantage, it will be noted that the web W-401 is picked up at the suction pickup roll 408 and conveyed on the suction pickup felt 411 to a first press nip N-49 which in this instance is also defined by a grooved roll 422a. The arrangement of FIGURE 12 thus affords a new arrangement for sticking the paper web on to the Yankee drier while simultaneously taking care of any tendency to overload the nip N-49 and actually effecting dewatering of the web at this nip using the grooved roll 422a which has the structure previously described for the roll 22, and is operated with an open area of substantially 25%. The felt 411 at the off-running side of the nip N-49 is removed quickly from the web W-401 and processed in a felt only press nip N-42 defined by a press couple 420 having the structure of the press couple 20 previously described and using an open area of substantially 25% in the lower grooved roll here designated 422b, for maximum moisture movement in reconditioning the felt at this felt only nip N-42 so that the felt will be in condition for the web nip N-41 in the operation already described.

As previously indicated, the two-headed arrows shown in the centers of various rolls in the views hereof indicate diagrammatically pneumatic loading means and anti-deflection roll mounting means, both of which are well known in the art. The anti-deflection roll mounting means are shown spccfiically in U.S. Patents No. 2,648,-122; 2,651,103 and 2,651,241. In addition, in my co-pending applications Serial No. 102,571, filed April 12, 1961, now Pat. No. 3,097,590, and Serial No. 154,801, filed November 24, 1961, now Pat. No. 3,097,591, preferred embodiments of anti-deflection mounting means for such rolls are disclosed. The anti-deflection roll mounting means employed herein are those involving mounting on rubber sandwiches on a through shaft as shown in my application Serial No. 102,571.

As also indicated herein, the grooves 22c in the roll 22 are preferably spirally formed at a relatively small spiral angle. The spiral angle of such grooves to the centroidal axis of the roll shell, which may be referred to as the angle alpha, may be expressed for a 20-inch diameter (i.e., 10-inch radius) press roll as tangent alpha equals approximately 0.125 divided by 10, or 0.0125. The range for tangent alpha should be within about 0.003 to about 0.03, preferably.

It will be understood that modifications and variations may be effected without departing from the spirit and scope of the novel concepts of the present invention.

In considering the various Yankee drier machines of FIGURES 1, 9, 10, 11 and 12, it must be appreciated that the Yankee drier, indicated by the 12 series of reference numerals in these views is an old and well-known but special piece of paper making machinery. Essentially the Yankee drier is a roll of considerable structural strength, but having ordinarily such a substantially greater diameter than the press rolls that are employed in cooperation therewith (i.e. generally 3 to 10 times greater diameter), the Yankee drier can ordinarily not be built economically to carry out all of its functions and still have the structural strength that would be available in a smaller press roll having an imperforate shell and anti-deflection mounting means of the type herein described, such as the preferred press roll structure for the roll 22 hereinbefore described. In view of this, it is important to be able to employ the grooved press rolls of the type herein described with appropriate deflection control and/or anti-deflection mounting means for use in cooperation with the Yankee drier. My previously mentioned disclosures herein describe deflection control as well as anti-deflection mounting means which are used in the embodiments of this invention.

The Yankee drier ordinarily presents an extremely smooth highly polished outer peripheral operating face on which the wet web is "pasted" at an initial nip and this smooth surface for the Yankee drier is used in many instances as a surface for the so-called "casting" of a smooth surfaced paper web. The Yankee drier is heated internally by steam or other conventional means and the smooth outer peripheral (generally metal) surface thereof is maintained at just below the boiling point of water ordinarily so as to avoid formation of steam between the surface of the Yankee drier and the web itself, while at the same time affording a maximum rate of drying. The web travels for a substantial amount of time on the heated smooth surface of the Yankee drier in order to effect the desired amount of drying. The types of webs which are formed on Yankee driers vary considerably, however, and the instant invention affords unusual advantages in that it provides for the use of grooved rolls in a number of different positions so as to provide for numerous of the more subtle advantages that are involved in the production of a particular type of paper web on a Yankee drier machine.

As a simple example, in FIGURE 1 the conventional suction pickup and suction roll 9 arrangement is used for transferring a relatively delicate web W-1 from the forming wire directly to the surface of the Yankee drier. This relatively delicate web W-1 is then pressed using the felt covered grooved press roll 13 after the web W-1 has had an opportunity to undergo at least preliminary heating on the surface of the Yankee drier. Preferably, the roll 13 is replaced by a roll of the structure of the roll 22 for reasons already pointed out; but in either case the same felt 11 which was used in the suction pickup and transfer arrangement is used to wrap the grooved roll 13 or 22 and to protect the relatively delicate web W-1. Further protection, if necessary, is afforded by the additional smoothing roll 12b. The advantage of the use of only a single felt to carry out these numerous functions is further made possible by the use of the two felt only press nips N-2 and N-2a, so that excellent control of felt moisture content and condition is afforded by the selected use of the grooved rolls of the invention in this arrangement.

It has been pointed out that still better control is obtained if the grooved rolls 15, 13 and 15a have the general structure of roll 22 hereinbefore described. In this respect it should be mentioned also that the grooved roll 22 has been described primarily hereinbefore as a rubber-covered roll, with the grooves cut in the rubber cover. It will be appreciated that in the position of the grooved roll 13 in FIGURE 1, it would be particularly important to use a rubber-covered grooved roll 22, so that there would be a roll 22 with a yielding surface at the nip N-1 and the chances of damage to the smooth surface of the Yankee drier 12 are minimized. It will be further appreciated, however, that in the case of the grooved rolls of the structure of the roll 22 which may be used in place of the rolls 15 and 15a shown in FIGURE 1, both of these grooved rolls can and in many instances preferably are rolls that are clad with a stainless steel cover in which the grooves are cut and the rolls are mounted for cooperation with the respective nip defining plain rolls 14 and 14a, using a resilient rubber-covered surface on the plain rolls. Here again the object being to employ at least one of the nip defining rolls with a resilient or yieldable surface to minimize damage to the rolls during operation, it will be seen that the plain rolls 14 and 14a may well be the rubber-covered rolls and the grooved rolls may be stainless steel clad, which affords the advantage of much longer wear in the general operation of the roll.

In FIGURE 9, it will be seen that one less press roll is employed and management of the moisture content and condition of the felt system is still maintained very easily. In fact, it will be appreciated that such management of the felt moisture content and condition that is obtained in FIGURE 9 does not necessarily require the use of the two felts 111 and 117, since it will be seen that only a single felt 311 is used in a comparable arrangement in FIGURE 11, so as to obtain the desired superior control of felt condition and content, still using less rolls than are employed in the embodiment of FIGURE 1. It will be seen that dotted lines associated with the felt rolls 311g and 311g' in FIGURE 11 show clearly the manner in which the machine of FIGURE 11 may be altered to use two felts instead of one in an arrangement comparable to that shown in FIGURE 9. The advantage of using two felts is that less exacting nip pressure controls at the various web and felt only nips may often be employed and different types of felts may be employed. Thus, a certain type of lightweight pickup and transfer felt 111 may be employed in the embodiment of FIGURE 9 for carrying out this function only; whereas a heavier felt, a more protective felt, or a felt of some other more advantageous weave structure or character such as the felt 117 may be used with a plain roll 116 in FIGURE 9 to obtain certain unusual advantages in the treatment of the web W-101 at the press nip N-11. The showing in FIGURE 9 would provide for the treatment of a most delicate type of web W-101 with maximum protection at the nip N-11. The rolls 116 and 122 being mounted on appropriate anti-deflection (control) means may effectively co-operate at the felt only nip N-12 to obtain exactly the desired conditioning of the felt and this pressure at the nip N-12 may be controlled quite independently of the comparatively lower nip pressure at the nip N-11 because of the anti-deflection roll mountings for the rolls 116 and 122. The same is, of course, true in the case of the embodiment of FIGURE 11 which is shown primarily to demonstrate an arrangement for superior control of the felt moisture content and condition in a Yankee drier machine which is adapted to use either one or two felts, to suit the particular needs of the mill operator.

Finally, in FIGURE 12, it will be seen that still other important advantages of the invention are afforded in an arrangement which requires only a single felt and which does not require the pressure loading of a suction roll. In other words, the initial pasting nip N-49 is operated with a grooved roll and there is no problem of even the comparatively nominal pressure load controls that would be employed at the pasting nip, using a perforate suction roll which can be mounted on anti-deflection mounting means only with considerable difficulty and at great expense. Also, the improved grooved roll structures shown for use in FIGURE 12 afford the use of even a smaller total number of press rolls in order to obtain the desired moisture control.

It must be appreciated that the versatility of Yankee drier type paper machines is such that there are many instances in which economy is of considerable importance, as contrasted to, for example, the optimum control of moisture content and felt condition. For example, the Yankee drier machine may be operated at a comparatively slower speed or using such a lightweight tissue that adequate drying is readily accomplished on the Yankee drier drum itself and excessive dewatering at nips associated with the Yankee drier may not be required. In such instances, however, the grooved rolls of the invention still afford a number of unusual advantages, in that they may be used to replace heretofore, considerably more expensive suction rolls. For example, in FIGURE 13, there is shown a greatly simplified and versatile Yankee drier machine arrangement for lightweight type webs that involves a substantial minimum in capital expenditure with unusual versatility in operation.

In referring to FIGURE 13, it will be seen that elements corresponding to those previously described in FIGURE 9 are designated by the same reference numerals in the 500 series. Thus, the Yankee drier indicated fragmentarily at 512, and the web W-501 is picked up from a forming wire W-500 traveling over couch and turning rolls 507 and 507a, respectively, by a pickup felt 511. But the pickup roll 508 here employed is a plain roll as contrasted to the more expensive suction pickup roll hereinbefore described and the transfer of the wet web W-501 to the underside of the pickup felt 511 is accomplished by appropriate moisture control in the pickup felt 511, operated on a plurality of guide rolls 511a, 511b, 511c, 511d, 511e and 511f (with tensioning and control rolls being included in conventional manner).

In the embodiment of FIGURE 13 it is advantageous, however, to carry out a preliminary dewatering of the web W-501 at a nip N-57 between an upper plain roll 551 wrapped by the felt 511 and a lower grooved roll 522 wrapped by a lower felt 523, mounted on appropriate guide rolls 524a through 524e. The nip N-57 in the arrangement shown in FIGURE 13 functions essentially to carry out a preliminary dewatering of the web W-501 without removing the web W-501 from the underside of the principal pickup felt 511. This is done by the use of the control of known variables which include such differences in the felts 511 and 523 as the use of an open weave for the felt 523 and a closed weave for the felt 511, and the elevated position of the felt guide roll 524b to cause the lower felt 523 to "wrap" the web onto the upper felt 511 briefly at the off-running side of the nip N-57. In addition, this dewatering of the web W-501 at the nip N-57 is further facilitated in the desired manner by the use of the grooved roll 522 (having 0.020 inch grooves and 0.105 inch lands).

It will be appreciated that the extent of water actually removed from the two felts 511 and 523 as well as the web W-501 at the nip N-57 will be essentially the water retained in the grooves of the roll 522, because a divided press arrangement is not used in this simplified, economical arrangement. The versatility in control of moisture movement at the nip N-57 that is afforded in addition to the known previously mentioned variables of felt character and the like is a versatility that is describable in terms of the open area used in the case of the grooved roll 522. This is the type of advantage which the grooved roll affords in the particular position indicated. It will further be appreciated, however, that there is still an additional advantage afforded by the grooved rolls of the invention in the position of the nip N-57 and this advantage resides in the replacement of the plain roll 551 with another grooved roll. In such instance, it will be appreciated that there will be a slight increase in capital expenditure, but the control of the relative open areas between the rolls 522 and 551 (if the roll 551 is now a grooved roll) affords a further measure of control of moisture movement at the nip N-57 and thus a further important element of control that contributes to the operation of the press arrangement. This aspect will be considered further in connection with the embodiment of FIGURE 15.

In further considering the operation of the device of FIGURE 13, it will be seen that the wet web W-501 is taken from the plain roll pickup position 508 to a pasting nip N-59 between a grooved roll 522a and the underside of the Yankee drier 512, at which nip N-59 the wet web W-501 is pasted or stuck on to the surface of the Yankee drier 512 and it then continues on the surface of the drier 512 for drying and removal in the conventional manner which need not be further described herein. It will be noted that the grooved roll 522a is provided with the conventional auxiliary equipment hereinbefore described and the felt guide rolls 511e and 511f maintain the felt 511 along approximately a common tangent between the rolls 512 and 522a. In the embodiment shown, the grooved roll 522a is considerably smaller than the Yankee drier 512 and in order to effect adequately rapid separation of the felt 511 at the off-running side of nip N-59, a slight amount of "wrap" of the grooved roll 522a by the felt 511 is tolerated. The grooved roll 522a, however, is preferably operated with the previously described general structure of the roll 22, but with a minimum open area of about 16% (i.e. grooves of about 0.020 inch and land areas of about 0.105 inch) so as to minimize rewetting of the felt 511 at the off-running side of the nip N-59. This affords good control for the desired amount of water removal at the nip N-59. In the operation of the machine of FIGURE 13, it will be appreciated that the felt 511 is operated at a different (greater) water content than would ordinarily be used for suction pickup, but this difference in water content and difference in felt texture and type which involves selection within the skill of the art is, however, facilitated and made more versatile by the positioning of the grooved roll 522a in the position here shown. The press assembly of FIGURE 13 does not require any suction rolls.

Referring now to FIGURE 15, it will be seen that merely by the use of one additional roll it is possible to provide a significant improvement in the control of moisture removal from the web, while still employing essentially the simplified arrangement of the Yankee drier machine of FIGURE 13. Referring to FIGURE 15, it will be seen that elements corresponding substantially in structure and function to those shown in FIGURE 13 are designated in FIGURE 15 in the 700 series. Thus, the Yankee drier is indicated fragmentarily at 712 and the web W-701 is transferred by a plain pickup felt 711 from the forming wire W-700 through an initial press nip N-77 and to the Yankee drier 712 at a nip N-79, in substantially the manner described in connection with the operation of the device of FIGURE 13. There is one essential difference, however, and that is that the initial web press nip N-77 is now defined between two grooved press rolls 722 and 760. The lower grooved press roll 722 is mounted in essentially the same manner as the lower grooved press roll 522 in the embodiment of FIGURE 13. The upper press roll 760, however, is here shown as a grooved roll in the position of the previously described plain roll 551 in FIGURE 13. The grooved roll 760 is provided with a saveall and auxiliary equipment arrangement designated generally 740 and comparing essentially to the corresponding equipment associated with the roll 42 in FIGURE 8. The esesntial difference here is that the two grooved rolls 722 and 760 may be used to influence the movement of moisture in the nip N-77, toward one roll or the other, or the two grooved rolls 722 and 760 may be used for maximum water removal with a minimum pressure gradient at the nip N-77. As previously mentioned, known variables including the selection of different felt structures, the elevation of the felt guide roll 724b and the like are capable of influencing the preference which the web W-701 will have for adherence to a felt at the off-running side of the nip N-77, and many of these factors are well understood by those skilled in the art. On the other hand, the use of the two grooved rolls 722 and 760 affords a very important and significant advantage in controlling moisture movement, independent of this particular aspect of the operation.

Thus, it will be appreciated that a relatively wet heavy felt 711 is found to be preferable for the plain pickup of certain types of webs W-701 and such webs tend to adhere well to this felt 711. When the felt 711 carrying the web W-701 is passed through the initial dewatering nip N-77, there will necessarily be movement of water. Using a relatively lightweight "open weave" press felt 723 to wrap a grooved roll 722 having a limited open area of 20% (i.e. grooves of 0.020 inch with land areas of about 0.080 inch), there will definitely be movement of water from the web W-701 through the felt 723 and into the grooves of the roll 722, in which this water will be retained to quite an extent because of the limited open area. Movement of water in this direction may tend to cause certain desired results but will not cause a tendency in the web W-701 to have a preferential adherence for the felt 723, which result is avoided (even when employing the upper grooved roll 760 with an open area of approximately 20%, i.e. 0.02 inch grooves for approximately 0.080 inch lands) by the use of the relatively more smooth or impervious, "harder," "closer," wet felt 711, as compared to the relatively more "open," "rough" or porous felt 723 which more readily vents through its exposed surface at the off-running side of the nip N-77 to "break" the vacuum between the web W-701 and the porous felt 723. In addition, it will be seen that the guide rolls 724a and 724b for the felt 723 are able to maintain this felt substantially tangential to the two rolls 722 and 760 and it will thus be a minimum rewetting of the felt 723 at the off-running side of the nip N-77 (which is further minimized by the small open area previously discussed in connection with the roll 722). The open area in the upper roll 760, however, will afford additional rewetting of the moist felt 711 and this rewetting of the felt 711 will also be exaggerated somewhat by the slight wrap of the felt 711 around the surface of the grooved roll 760 at the off-running side of the nip N-77 (by positioning the felt guide roll 724b slightly above the tangent plane), so the preferred moisture balance for best adherence between the felt 711 and the web W-701 may be readily obtained at the off-running side of the nip N-77, even though a substantial amount of water may have been removed at the nip N-77 via the ground roll 722 plus an additional amount of water that would be retained in the grooves of the upper grooved roll 760.

As previously indicated, in FIGURE 15 the felt wrapped grooved roll 722a pastes the web W-701 on to the surface of the Yankee drier 712 at the nip N-79. The grooved roll 722a is, of course, capable of removing water as well as merely avoiding overloading of the nip N-79, because of the grooves in the roll 722a.

An additional feature in the device of FIGURE 15 involves the use of a web press nip N-71 between the grooved roll 761 and the uprunning side of the Yankee drier 712. The grooved roll 761 has, again, a structure generally of the type previously described in connection with the roll 22 and it is operated with an open area of 20% (i.e. 0.020 inch grooves with 0.080 inch lands). The auxiliary saveall and the like equipment for the roll 761 is indicated diagrammatically and need not be described in further detail; but it will be noticed that the felt 762 which wraps the grooved roll 761 is mounted between guide rolls 762a and 762b so as to be substantially tangential to the two rolls 712 and 761. This affords rapid separation of the felt 762 from the uprunning Web W-701 to minimize rewetting of the same at the off-running side of the nip N-71, in the manner previously described, and the use of 20% open area or perhaps even 15% open area in the grooved roll 761 also minimizes rewetting of the felt 762 and thus affords excellent moisture control for the felt 762 system, using only a single grooved roll 761. It must be appreciated, however, that although this arrangement has distinct economic advantages, still better moisture control for the felt system 762 of FIGURE 15 can be obtained using the arrangement shown in FIGURE 14 wherein elements corresponding to those shown in FIGURES 13 and 15 are designated by the same reference numerals in the 600 series.

For example, in FIGURE 14 a plain pickup felt 611 is used to pick up the web W-601. The initial press corresponding to the nips N-57 and N-77 of FIGURES 13 and 15, respectively, are not employed in the embodiment of FIGURE 14 and the machine is simplified to this extent at a sacrifice in mechanical dewatering in this particular location. The grooved roll 622, however, may be employed with a slightly greater nip load at the initial nip N-69 where the web W-601 is pasted on to the Yankee drier 612, and the grooved roll 622 may be operated with a minimum open area of 15% (i.e. preferably 0.020 inch grooves with 0.105 inch lands for 16%) so that in spite of the slight wrap of the grooved roll 622 at the off-running side of the nip N-69 because of the difficulty in positioning the felt guide roll 611e moisture removal is effected at the nip N-69. It will thus be seen that the advantage of mechanical removal of water can be afforded to a substantial extent at the nip N-69 in all three of the embodiments of FIGURES 13, 14 and 15. Of course, relatively high nip load pressures can be used at the separate first presses N-57 and N-77 because of the use of anti-deflection roll loading means and maximum advantage of the use of mechanical pressure for water removal may be effected within the limitations and controls necessary to obtain the preferential adherence of the web W-501 and W-701 for the felts 511 and 711, respectively. On the other hand, the embodiment of FIGURE 14 demonstrates an arrangement for the best moisture removal conditions at a web press nip N-61 on the uprunning side of the Yankee drier 612 above the initial nip N-69. The web press nip N-61 is defined by the Yankee drier and a grooved roll 661 which is operated as a part of a divided press system with a separate felt only nip N-62 between a plain press roll 680 and a grooved press roll 681. It will thus be seen that the felt 662 which wraps the grooved roll 661 defining the web press nip N-61 is readily conditioned for optimum and maximum water removal at the felt only press nip N-62 at the oncoming side of the web nip N-61. In this way, a felt 662 having a high capacity to remove water may be employed at the nip N-61 using relatively nominal nip pressures which the Yankee drier 612 can withstand for maximum water removal, because the divided felt only press nip N-62 may be used to obtain excellent control of the water absorption characteristics of the felt 662. In this respect, it will be appreciated that the felt guide rolls 662a and 662b are positioned to make sure that there is a rapid separation of the felt 662 from the web W-601 at the off-running side of the nip N-61 to minimize rewetting of the web W-601. This particular felt guide arrangement with the large size Yankee drier 612 may involve a certain amount of wrap of the grooved roll 661, as indicated, but rewetting of the felt 662 by the grooved roll 661 at the off-running side of the nip N-61 is a matter that can be controlled not only by controlling the open area of the grooved roll 661 but also by virtue of the fact that the separate felt only press nip N-62 is available to correct for any excessive rewetting. In fact, the arrangement in FIGURE 14 would in certain instances permit at least some nominal economies in capital expenditure if the roll 661 were merely a plain felt covered roll rather than a grooved roll, but operated in the divided press arrangement herein indicated. It will thus be appreciated that although there are certain distinct advantages in attempting to maintain the felt substantially tangential to a grooved roll at a press nip area (for reasons which have been detailed hereinafter) there are times when sacrifices may be made in connection with these particular advantages to the end that distinctly improved operating conditions are obtained in other respects; and this is particularly so in the case of the large size Yankee drier when it is desired to separate the felt from the web at the off-running side of the nip as quickly as possible to minimize the rewetting of the web via the felt.

One of the problems in web pressing is avoidance of "crushing" of the web which is perhaps a poorly chosen but very meaningful word of the art—actually meaning "incipient fracture" of the web—caused by excessive, poorly directed water flow in the web at the nip. Thus, referring to FIGURE 4, it will be seen that at the oncoming side of the nip N-1 the pressure Po in the web as well as the felt or porous belt 11 is nominal (i.e. about 15 pounds per square inch absolute); whereas at the middle (or cross-machine center line) of the nip N-1 the pressure $Pm$ is at a maximum (usually at least as great as the nip load in pounds per lineal inch or greater because the longitudinal dimension of the maximum nip load is often less than 1 inch); and, of course, at the off-running side of the nip N-1 the expanding felt 11 tends to create a subatmospheric (or vacuum) pressure $Pv$ (e.g. from about 2 to 5 pounds per square inch absolute) depending to a great extent on the ability of the porous felt or belt 11 to receive ambient atmosphere (since the pressed web W-1 is substantially non-porous in this condition).

Generally in "crushing" $Pm$ is so much greater than $Po$ that in the case of a substantial total water load entering the nip N-1 there is created a flow of water in the web from $Pm$ toward $Po$ and this results not only in the visible collection of water as a pool at the oncoming side of the nip but also in a web product which will have many small cross-machine "cracks" or incipient fractures that can be observed in the final product. The grooves 13c, however, being vented to ambient atmosphere afford the easiest water flow path (backward and forward) in the nip, so even though the pools of water may be evidenced in the present press nips, crushing of the web can be avoided because there is an avoidance of undesirable water flow in the web itself.

Referring to FIGURE 5B, it will be thus seen that the maximum pressure $Pm$ actually occurs only at the machine direction center line M of each land area 22b (generally along the cross-machine center line of the nip N-3) and the minimum or nominal pressure $Po$ is actually adjacent thereto (along the cross-machine center line of the nip N-3) so that the net effect of the pressure application at the nip N-3 may appear to be the same (or greater, depending upon the particular press position) nip load in pounds per lineal inch but the water flow from the moist web W-6 to the porous felt or belt 23 is essentially a non-crushing, normal or perpendicular to the plane P—P flow, with reference to the plane P—P between the web W-6 and the felt 23 (for example as shown in FIGURES 4 and 5A). There is no "crushing" flow of water in the web along the plane P—P in the direction $Pm$ toward $Po$, nor is there in the nip N-3 of FIGURES 5A and 5B. Moreover, the extremely small axial dimension 27 of the land 22b, 22b of FIGURE 5B avoids any cross-machine "crushing" flow of water in the web in the direction indicated as $Pm$ toward $Po$. Instead, in FIGURE 5B, there is presented a felt 23 which has theoretically a low "average" pressure of ½ of the total of $Pm$ plus $Po$ to readily receive water generally normal to the plane P—P at the web-felt interface, followed by a flow of water to a limited extent only within the felt 23 and for the limited dimension 27½ in the direction previously indicated. This affords an advantage of extremely high press nip loads, in pounds per lineal inch, when desired, without crushing.

It should also be noted that, even assuming that, in FIGURE 5B $Pm$ is equal to such desired high nip loads as 100, 200, 300 or even 450 pounds per lineal inch (although $Pm$ in pounds per square inch will probably be much higher often because the longitudinal dimension of maximum nip pressure $Pm$ is usually less than 1 inch), the driving force against the water is $Pm$ minus $Po$ which is usually in the range of several hundred pounds per square inch. The time this driving force is applied is very brief (i.e., for a machine speed of about 200 feet per minute and an oncoming nip side of perhaps ½ inch, such time being approximately $3 \times 10^{-7}$ seconds) but the driving force is so great and the maximum water travel path 27½ so small that substantially all of the water is almost instantly driven into the deep grooves 22c, with substantial avoidance of a web crushing pressure gradient in the nip plane P—P either longitudinally or in the cross-machine direction. In particular, the very narrow (axially) lands 13b and 22b between narrow (but appropriately large) grooves 13c and 22c make the physical phenomenon possible. Hence axial land width particularly for higher speed machines, in the neighborhood of 0.05 to 0.15 (and preferably 0.08 to 0.1) inch are important.

The groove dimensions are also important in that 0.025 may be ideal for a given press whereas a reduction to 0.02 for the width 26 in FIGURE 5B in the same press has actually been found to produce a distinct reduction (or substantial elimination) of evidence of marking in certain webs, thereby demonstrating the criticality of superficially very small dimensional changes in this aspect of the structure.

Still another extremely important aspect of groove structure is the cross-sectional area or volume, which has already been expressed in terms of the mouth width of "x" as a practical minimum of twice the square of the mouth width (i.e. at least $2x^2$) and preferably four to five times the square of the mouth width. This volume is not necessarily so much for merely the desired capacity to receive water but more for the necessary ability to vent to the ambient atmosphere and maintain $Po$ at substantially ambient atmospheric pressure of 15 pounds per square inch absolute. In pulp making machines, wherein the speeds are relatively slow and the water loads relatively high, the grooves actually function very satisfactorily as "flow troughs" using the dimensions of 0.02 to 0.25 inch groove mouths with a normal machine taper (e.g. about 7%) to a depth 28 of only 0.06 inch, i.e., a cross-sectional area of two to three times the square of the mouth width. It is important to consider the groove volumes (i.e. cross-sectional areas) on the basis of the groove mouth width "x" because shallow tapered grooves may be incapable of the necessary venting function and/or the necessary ability to resist the tendency for the felt to reabsorb all of the water in the grooves at the off-running side of the press nip.

The groove mouth width 26 has still another very important function, often expressed in terms of open area, and this pertains to the overall resistance to water return from the grooves to the subatmospheric felt at the off-running side of the nip. Again, using the previously described operating conditions, it will be appreciated that, during the very brief period of approximately $3 \times 10^{-7}$ seconds in which the felt expands at the off-running side of the nip (cross-machine center line), the driving force $P_o$ minus $P_v$ or about 10 to 12 pounds per square inch tending to return water from the grooves to the absorbent felt is comparatively much less than the several hundred pounds per square inch driving force pushing the water into the grooves of the oncoming side of the nip during a substantially equal time interval. Additional unfavorable factors include the effect of centrifugal force and the effect of perhaps a longer time interval (since it is difficult to separate the felt from the grooved roll surface at the very instant that the nip pressure is relieved); but all of these unfavorable factors are more than counteracted by (a) the very great difference in actual driving forces (b) the reasonably rapid removal of the felt from the grooved roll surface, and (c) the water travel path, since the water must travel (1) first generally normally to the felt plane toward the groove mouth for (2) a rather substantial distance, partciularly in the case of the water at the bottom of the deeper grooves, past closely adjacent groove walls tending to resist water movement both by (3) frictional drag and (4) molecular or capillary-like attraction between the water and the groove wall material and then through (5) a right-angle turn for (6) still another substantial distance 27½ shown in FIGURE 5B to the center line of the land area. Water removal is thus effected at conventional higher machine speeds and lower open areas here specified simply because the off-running time interval is wholly insufficient to permit the felt to withdraw all of the water from the grooves—or even, for that matter, to permit creation of equilibrium or balanced water conditions between the felt and grooves (which would allow for the retention of some water in the grooves anyway).

At slower operating conditions using the same structures, even if equilibrium conditions were reached, the grooves must hold and carry off substantial quantities of water. And at even slower conditions such as were indicated as a possibility with a pulp machine the comparatively larger land areas afford the necessary nip pressure application whereas the comparatively (axially) smaller grooves afford vented, free flow of water away from the nip and out of the system into conventional receptacles in any case, water removal is thus effected.

It will thus been seen that the shallow and/or sharply tapered grooves, having semicircular or triangular cross-sectional areas which are functionally significantly below about twice the square of the groove mouth width in cross-sectional area are either incapable of satisfactory venting, satisfactory resistance of return of water to the absorbent felt at the off-running side of the nip, or both. The suggested minimum of $2x^2$ is practical as well as functional, since it is conceivable that certain principles of the invention could be followed, for example, using so-called "shallow" grooves having the "general" cross-section of perhaps an equilateral triangle (and hence a cross-sectional area of only $\frac{1}{3}x^2$) but with a relatively deep but very narrow and hence small volume slot of only perhaps 0.002 inch width extending radially inwardly from the apex of such triangle; but such slot would have to have some functional volume because this would constitute essentially the only volume of water not reabsorbed by the felt from such shallow grooves in the normal operation, and again in slow operation the slot would still require some volume to afford the required venting function (and to this end continuous cleaning to keep the slot functional would be difficult or impractocal). The grooves have already been described as requiring substantial depth to accommodate these essential functions.

Occasional cross-machine slots on the lands (and/or conduits beneath the land surfaces) interconnecting the generally circumferential grooves would not be precluded by the basic principles of the invention, but such structures are not preferred primarily because whatever useful function they might have would ordinarily be impaired by practical considerations relative to maintaining such structures clean. In ordinary operation, for example, the cross-machine slots on the lands would probably fill up quickly and unless continuously cleaned by additional auxiliary equipment such as brushes, water jets and the like, functionally continuously cylindrical lands would result. In any event, whatever type of groove structure attempted (other than the hereinbefore described substantially circumferential structure) would be subject to the same basic limitations of groove width, open area, depth, cross-sectional area and general contour hereinbefore described, plus the added requirement of rotary brushes, water jets or other generally less preferred auxiliary equipment for continuous cleaning.

I claim as my invention:

In a Yankee drier paper-making machine, in combination, traveling felt means for receiving a moist paper web from a forming surface and placing the web on a hot Yankee drier to effect warming of the water in such moist paper web, a first press roll wrapped by said felt means and defining a first web press nip with the Yankee drier, said first web press nip receiving and dewatering the web and sticking the web to the Yankee drier surface, a second press roll wrapped by said felt means and defining a second web press nip with said Yankee drier at a region on the Yankee drier spaced from said first press nip to further dewater the web by mechanical pressure after it has been stuck to such Yankee drier surface and while the web is being heated by and carried upwardly by such Yankee drier, said second press roll being a grooved roll presenting a peripheral surface portion having a plurality of alternating generally circumferentially aligned grooves and ridges, said ridges presenting smooth generally cylindrical closely spaced land areas for supporting the felt and permitting the felt to bridge the grooves, said grooves being substantially 0.005 to 0.035 inch in axial dimension but being vented to ambient atmosphere at the oncoming and off-running sides of the second press nip defined by said grooved roll to facilitate reception of warmed water from the moist web and through the felt means and into such grooves which present at the grooved roll periphery at such second press nip an average ratio of groove-to-land axial dimensions within the range of 1:2 to 1:20 to minimize return movement of such warmed water at the off-running side of such second press nip from such grooves back through said felt means and into said web moving on the Yankee drier surface, and guide means for said felt means for separating the felt means from both the web and said grooved roll periphery at the immediate off-running side of said second press nip to further minimize the aforesaid return movement of such warmed water.

References Cited by the Examiner

UNITED STATES PATENTS

| | | | |
|---|---|---|---|
| 1,321,956 | 11/19 | Wagner | 100—112 |
| 1,483,562 | 2/24 | Wagner | 162—358 |
| 1,517,836 | 11/24 | Wagner. | |
| 1,520,489 | 12/24 | Wagner. | |
| 1,552,098 | 9/25 | Wagner. | |
| 1,905,911 | 4/33 | Kellett. | |
| 2,784,652 | 3/57 | Hornbostel. | |
| 2,858,747 | 11/58 | Wagner | 162—361 |

FOREIGN PATENTS 399,113  9/33  Great Britain.

DONALL H. SYLVESTER, *Primary Examiner.*